(12) United States Patent
Nurse et al.

(10) Patent No.: US 12,503,175 B2
(45) Date of Patent: Dec. 23, 2025

(54) SYSTEM FOR IMPROVING VEHICLE EFFICIENCY

(71) Applicants: Colin A. Nurse, Newark, DE (US); Jerome Timothy Kegelman, Wilmington, DE (US)

(72) Inventors: Colin A. Nurse, Newark, DE (US); Jerome Timothy Kegelman, Wilmington, DE (US)

(73) Assignee: Scandinavian Automotive Systems Inc., Newark, DE (US)

( * ) Notice: Subject to any disclaimer, the term of this patent is extended or adjusted under 35 U.S.C. 154(b) by 398 days.

(21) Appl. No.: 18/201,855

(22) Filed: May 25, 2023

(65) Prior Publication Data

US 2023/0391409 A1 Dec. 7, 2023

Related U.S. Application Data

(60) Provisional application No. 63/348,088, filed on Jun. 2, 2022.

(51) Int. Cl.
| | |
|---|---|
| *B62D 35/00* | (2006.01) |
| *F04D 13/02* | (2006.01) |
| *F16H 7/02* | (2006.01) |
| *F16H 7/12* | (2006.01) |
| *F16H 7/14* | (2006.01) |
| *F16H 57/035* | (2012.01) |
| *F16H 7/08* | (2006.01) |

(52) U.S. Cl.
CPC ......... *B62D 35/001* (2013.01); *F04D 13/021* (2013.01); *F16H 7/02* (2013.01); *F16H 7/1281* (2013.01); *F16H 7/14* (2013.01); *F16H 57/035* (2013.01); *F16H 2007/081* (2013.01); *F16H 2007/0865* (2013.01); *F16H 2007/0893* (2013.01); *F16H 2007/0897* (2013.01)

(58) Field of Classification Search
CPC ....... B62D 35/001; F04D 13/021; F16H 7/02; F16H 7/1281; F16H 7/14; F16H 57/035; F16H 2007/081; F16H 2007/0865; F16H 2007/0893; F16H 2007/0897
See application file for complete search history.

(56) References Cited

U.S. PATENT DOCUMENTS

| | | | |
|---|---|---|---|
| 4,168,759 A * | 9/1979 | Hull | F03D 15/10 180/2.2 |
| 7,578,541 B2 | 8/2009 | Layfield et al. | |

(Continued)

*Primary Examiner* — Steven O Douglas
(74) *Attorney, Agent, or Firm* — Krenz Patent Law, LLC

(57) ABSTRACT

A system for improving vehicle efficiency includes first and second drive pulleys, each configured for attachment to a vehicle wheel, first and second chambers, each configured for attachment to a vehicle side near a vehicle rear and including an air intake opening, air discharge orifice, and curved exterior surface. The system also includes first and second impellers that each include a shaft and a plurality of blades, respectively interior of the first and second chambers, first and second driven pulleys coupled respectively to the shafts of the impellers, and first and second belts that respectively couple the first and second drive pulleys to the first and second driven pulleys. Wheel rotation causes rotation of the drive pulleys, which via the belts cause rotation of the driven pulleys, which cause rotation of the shafts, which causes rotation of the pluralities of blades.

19 Claims, 31 Drawing Sheets

(56) References Cited

U.S. PATENT DOCUMENTS

| | | | |
|---|---|---|---|
| 8,710,691 B2 * | 4/2014 | Haddad | B60L 8/006 |
| | | | 290/55 |
| 8,783,758 B2 | 7/2014 | Baker | |
| 9,211,919 B2 | 12/2015 | Strehl | |
| 9,440,688 B2 | 9/2016 | Smith et al. | |
| 9,873,467 B2 | 1/2018 | Wall, II | |
| 10,220,889 B2 | 3/2019 | Smith et al. | |
| 10,437,262 B2 | 10/2019 | Smith et al. | |
| 11,267,335 B1 * | 3/2022 | Knickerbocker | F03D 3/0409 |
| 12,378,946 B1 * | 8/2025 | Kourtoff | F03D 3/002 |
| 2021/0129923 A1 | 5/2021 | Burrows et al. | |

\* cited by examiner

SYSTEM FOR IMPROVING VEHICLE EFFICIENCY

CROSS REFERENCE TO RELATED APPLICATION

This application claims the benefit of U.S. Provisional Patent Application No. 63/348,088, filed 2 Jun. 2022, entitled "SYSTEM FOR IMPROVING VEHICLE FUEL EFFICIENCY," the entire contents of which is hereby incorporated by reference in its entirety.

TECHNICAL FIELD

This document generally describes systems, devices, and methods for improving efficiency for vehicles.

BACKGROUND

By one recent estimate, the trucking industry is responsible for transporting about 70% of all goods in the United States. For example, trucks are often used to transport goods from rail yards, shipping ports, and airports to final destinations. Tractor-trailers, which typically include a long trailer and a semi-tractor (often abbreviated, "tractor") that pulls the trailer, are widely used for hauling freight.

Various passive approaches have been used to improve aerodynamics of tractor-trailers for improving fuel efficiency. One passive approach that has been used is trailer skirts, which are typically one or more panels mounted at the lower side edges of a trailer or underneath the trailer to help deflect air and prevent air from blowing under the trailer. Another passive approach that has been used is trailer tails, which are typically collapsible panels that are mounted to the rear of the trailer and fold out from the rear of the trailer to deflect air leaving the trailing edge of the trailer's sides. Yet another passive approach that has been used is a tractor wing, which is typically a panel or panels mounted on the top of the tractor to help deflect air over the trailer. Each of the foregoing examples use one or more panels to passively deflect air flowing in a vicinity of the tractor or trailer.

SUMMARY

In a first general aspect, a system for improving efficiency of a vehicle includes a first drive pulley that is configured to be attached to a left-side wheel of the vehicle, and a second drive pulley that is configured to be attached to a right-side wheel of the vehicle. The system also includes a first chamber that is configured to be attached to a left side of the vehicle substantially near a rear of the vehicle and includes a first air intake opening at a lower portion of the first chamber, a first air discharge orifice, and a first curved exterior surface. The system further includes a second chamber that is configured to be attached to a right side of the vehicle substantially near the rear of the vehicle and includes a second air intake opening at a lower portion of the second chamber, a second air discharge orifice, and a second curved exterior surface. The system further includes a first impeller that is attached to the first chamber and includes a first shaft and a first plurality of blades, the first plurality of blades located interior of the first chamber. The system further includes a second impeller that is attached to the second chamber and includes a second shaft and a second plurality of blades, the second plurality of blades located interior of the second chamber. The system further includes a first driven pulley coupled to the first shaft of the first impeller, and a second driven pulley coupled to second shaft of the second impeller. The system further includes a first belt that couples the first drive pulley to the first driven pulley, and a second belt that couples the second drive pulley to the second driven pulley. Rotation of the left-side wheel causes rotation of the first drive pulley, which causes rotation of the first driven pulley via the first belt, and the rotation of the first driven pulley causes rotation of the first shaft, which causes rotation of the first plurality of blades. Rotation of the right-side wheel causes rotation of the second drive pulley, which causes rotation of the second driven pulley via the second belt, and the rotation of the second driven pulley causes rotation of the second shaft, which causes rotation of the second plurality of blades.

Implementations can include one or more of the following. The rotation of the first plurality of blades may draw air from outside the first chamber into the first chamber via the first air intake opening and may pressurize the air within the first chamber, and the rotation of the second plurality of blades may draw air from outside the second chamber into the second chamber via the second air intake opening and may pressurize the air within the second chamber. The pressurized air within the first chamber may discharge from the first chamber via the first air discharge orifice and may follow the first curved exterior surface of the first chamber, and the pressurized air within the second chamber may discharge from the second chamber via the second air discharge orifice and may follow the second curved exterior surface of the second chamber. The pressurized air that follows the first curved exterior surface of the first chamber may oppose the pressurized air that follows the second curved exterior surface of the second chamber, which may create an area of higher pressure behind the vehicle as compared to ambient pressure. The vehicle may comprise a tractor-trailer that includes a tractor and a trailer, the first drive pulley may be configured to be attached to a left rear wheel of the trailer, and the second drive pulley may be configured to be attached to a right rear wheel of the trailer. The first chamber may be attached to a left side of the trailer, the first curved exterior surface may extend to a back edge of the left side of the trailer, the second chamber may be attached to a right side of the trailer, and the second curved exterior surface may extend to a back edge of the right side of the trailer. The first air discharge orifice may include a first slot that extends substantially a greatest length of the first chamber, and the second air discharge orifice may include a second slot that extends substantially an entire greatest length of the second chamber. The first slot may include a first reinforcement member, and the second slot may include a second reinforcement member. The system may also include a first redundant belt that couples the first drive pulley to the first driven pulley, and a second redundant belt that couples the second drive pulley to the second driven pulley. The first curved exterior surface of the first chamber may be a convex surface, and the second curved exterior surface of the second chamber may be a convex surface. The first curved exterior surface of the first chamber may have a quarter-circle shape, and the second curved exterior surface of the second chamber may have a quarter-circle shape. The vehicle may be diesel-powered, and the system may improve fuel efficiency of the vehicle. The vehicle may be gasoline-powered, and the system may improve fuel efficiency of the vehicle. The vehicle may be battery-powered, and the system may improve battery efficiency of the vehicle. The system may further include a first tensioning pulley that may be configured to maintain a first tension on the first belt, and a second tensioning pulley that may be configured to maintain a second tension on the second belt. The system may further include a first sensor that may be configured to detect a failure of the first belt, and a second sensor that may be configured to detect a failure of the second belt. The first sensor may include an indicator of the failure of the first belt, and the second sensor may include an indicator of the failure of the second belt. The system may further include a first guard element that covers the first drive pulley, the first belt, the first driven pulley and the first impeller, and may further include a second guard element that covers the second drive pulley, the second belt, the second driven pulley and the second impeller. The system may further include a first slide adjuster configured to adjust a centerline distance from a shaft of the first drive pulley to a shaft of the first driven pulley, and a second slide adjuster configured to adjust a centerline distance from a shaft of the second drive pulley to a shaft of the second driven pulley.

Other features, objects and advantages of the technology described in this document will be apparent from the description and the drawings, and from the claims.

BRIEF DESCRIPTION OF THE DRAWINGS

Like reference symbols in the various drawings indicate like elements.

DETAILED DESCRIPTION

Described herein are systems, devices, and methods that can be used to provide improved efficiency for vehicles, such as improved fuel (e.g., diesel fuel, gasoline, or other vehicle fuels) efficiency or improved battery-charge life or longer run periods or mileage for a given battery charge, according to various implementations. Described herein are systems, devices, and methods that can be used to provide reduced fuel consumption for vehicles, according to various implementations. In some examples, use of the systems, devices, and methods described herein may lead to an improved fuel efficiency or battery efficiency of 1-5%. In some examples, use of the systems, devices, and methods described herein may lead to an improved fuel efficiency or battery efficiency of 5-10%. In some examples, use of the systems, devices, and methods described herein may lead to an improved fuel efficiency or battery efficiency of greater than 10%.

In some examples, the systems, devices, and methods described herein may be used with vehicles powered by gasoline or diesel fuel. In some examples, the systems, devices, and methods described herein may be used with electric-powered vehicles, and may provide improved battery life or longer run periods or mileage for a given battery charge.

In some examples, the systems, devices, and methods described herein may be used with tractor-trailer vehicles. In some examples, the systems, devices, and methods described herein may be used with box truck vehicles or other truck vehicles. In some examples, the systems, devices, and methods described herein may be used with recreational vehicles ("RVs"). In some examples, the systems, devices, and methods described herein may be used with busses. In some examples, the systems, devices, and methods described herein may be used with passenger vehicles, such as cars, SUV's, station wagons, crossover vehicles, pickup trucks, and the like.

In some examples, the systems, devices, and methods described herein may be used to pressurize (e.g., increase pressure at) a space rearward-of or behind a rear surface of the trailer of a tractor-trailer. In some examples, the systems, devices, and methods described herein may be used to pressurize (e.g., increase pressure at) a space rearward-of or behind a rear surface of another type of vehicle (e.g., box truck or other type of truck, RV, bus, passenger vehicle). In some examples, by pressurizing the space behind the rear surface of the trailer or other type of vehicle, drag on the trailer or vehicle may be reduced. In some examples, by pressurizing the space behind the rear surface of the trailer or vehicle, draft may be reduced. In some examples, by reducing draft or by reducing drag on the trailer or vehicle, improved fuel efficiency for fuel-powered vehicles (e.g., gasoline- or diesel-powered vehicles) or improved battery life or longer run periods or mileage for a given battery charge for electric vehicles may be realized.

Figure 1:
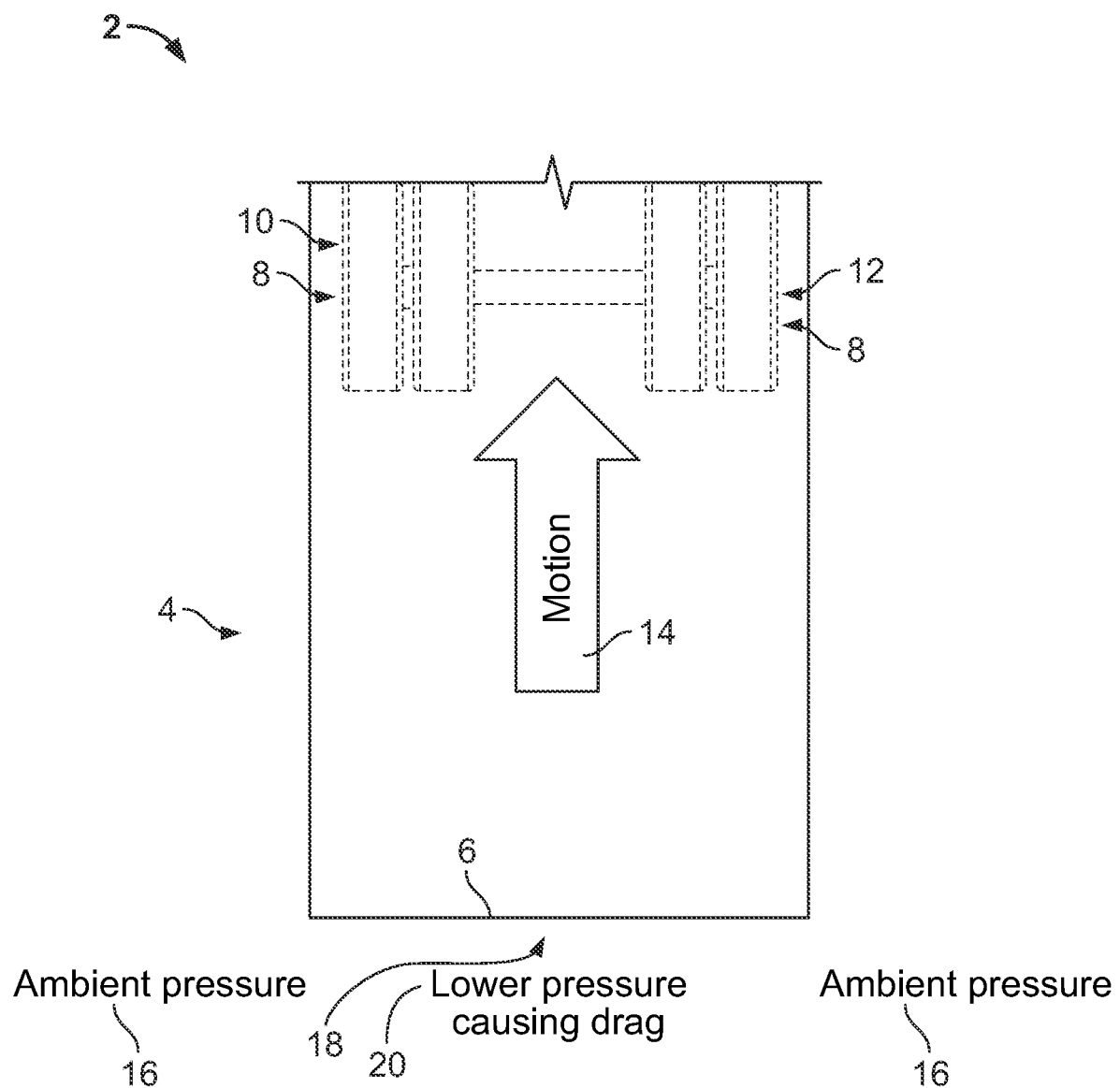
FIG. 1 is a conceptual top view of a rear portion of a traditional trailer of a tractor-trailer.

FIG. 1 is a conceptual top view 2 of a rear portion of a traditional trailer 4 of a tractor-trailer, where a rear surface 6 of the trailer 4 shown is near the bottom of the figure. The trailer 4 includes wheels 8, which as shown in FIG. 1 represent rear wheels of the trailer 4. It will be understood that the wheels 8 (and tires) are underneath the trailer 4, as is conventional, and that the wheels 8 are shown in FIG. 1 to illustrate their position relative to the rear of the trailer 4. A left-side rear wheel 10 and a right-side rear wheel 12 are shown. With a traditional trailer 4 that is moving forward, where the forward motion is indicated by a "Motion" arrow 14, for example as being pulled by a tractor of the tractor-trailer down a highway, areas to the left and right of the trailer may experience ambient pressure 16, and a space 18 behind the rear surface 6 of the trailer 4 may experience lower pressure 20 (e.g., lower pressure relative to ambient pressure), which may cause drag or draft. This drag or draft can be disadvantageous to fuel efficiency or fuel mileage, in some examples.

Figure 2:
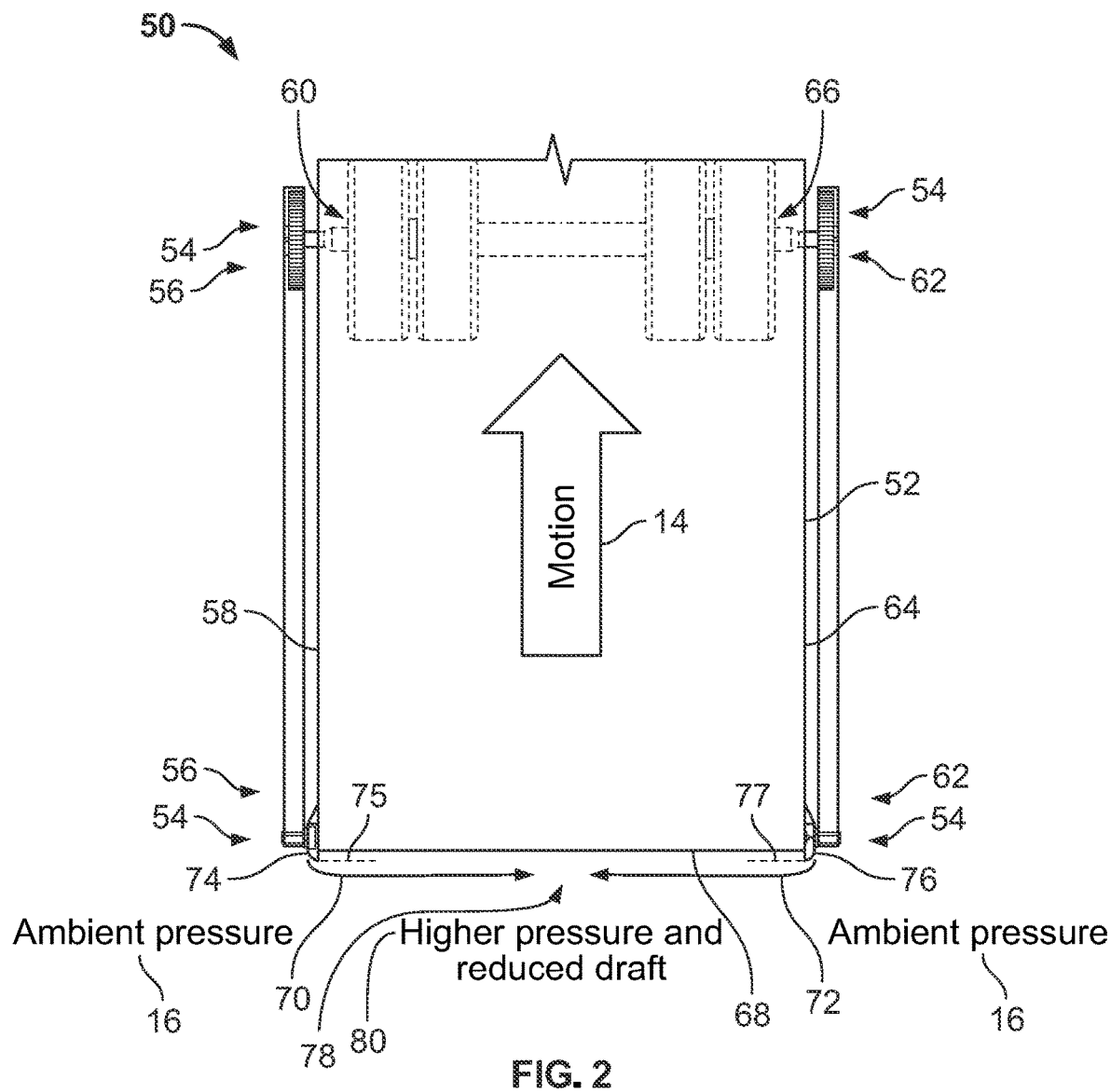
FIG. 2 is a conceptual top view of a rear portion of an example trailer of an example tractor-trailer, and an example system for improving vehicle efficiency.

FIG. 2 is a conceptual top view 50 of a rear portion of an example trailer 52 of an example tractor-trailer, and an example system 54 for improving vehicle efficiency. The example system 54 for improving vehicle efficiency includes a first or left sub-system 56, generally to the left of the trailer 52 with a portion attached to a left side 58 of the trailer 52 and a portion attached to a left rear wheel 60 of the trailer 52, and also includes a second or right sub-system 62, generally to the right of the trailer 52 with a portion attached to a right side 64 of the trailer 52 and a portion attached to a right rear wheel 66 of the trailer 52. It will be understood that the wheels 60, 66 are underneath the trailer 52 (as better shown in FIG. 3, for example), and that the wheels 60, 66 are shown in FIG. 2 to illustrate their position relative to the rear of the trailer 52.

A rear surface 68 of the example trailer 52 is shown near the bottom of FIG. 2, and as previously mentioned, the wheels shown in FIG. 2 represent rear wheels of the trailer 52. As will be described herein below, in operation the example system 54 for improving vehicle efficiency may generate a first curtain or stream 70 of pressurized air and second curtain or stream 72 of pressurized air, as indicated by the arrows generally behind the trailer 52 in FIG. 2. For example, the first curtain or stream 70 of pressurized air may be generated by the left sub-system 56, and may follow a first curved surface 74 of the system 54 for improving vehicle efficiency and proceed generally along the rear surface 68 of the trailer 52 in a left-to-right direction, as indicated by the left arrow in FIG. 2. Similarly, the second curtain or stream 72 of pressurized air may be generated by the right sub-system 62, and may follow a second curved surface 76 of the system 54 for improving vehicle efficiency and proceed generally along the rear surface 68 of the trailer 52 in a right-to-left direction, as indicated by the right arrow in FIG. 2.

In some examples, the first curved surface 74 may be an exterior surface of the left sub-system 56, and may have a convex shape. In some examples, the first curved surface 74 may be an exterior surface of the left sub-system 56, and may have a quarter-circle shape. For example, the first curved surface 74 may have a profile that approximates one-quarter of a circle, according to some examples. In some examples, a first line 75 that is tangent to the first curved surface 74 at a rearward edge of the first curved surface 74 may be generally parallel to the rear surface 68 of the trailer 52.

In some examples, the second curved surface 76 may be an exterior surface of the right sub-system 62, and may have a convex shape. In some examples, the second curved surface 76 may be an exterior surface of the right sub-system 62, and may have a quarter-circle shape. For example, the second curved surface 76 may have a profile that approximates one-quarter of a circle, according to some examples. In some examples, a second line 77 that is tangent to the second curved surface 76 at a rearward edge of the second curved surface 76 may be generally parallel to the rear surface 68 of the trailer 52.

In this manner, the two generated curtains or streams 70, 72 of pressurized air may oppose one another in a space 78 behind or rearward of the trailer 52, for example behind or rearward of the rear surface 68 of the trailer 52. Due to this opposition of pressurized air streams 70, 72 behind the trailer 52, the space 78 behind the trailer 52 where the streams 70, 72 oppose one another may become pressurized and may have a higher pressure 80, for example may have a higher pressure than ambient pressure 16 to the sides of the trailer 52. In some examples, this higher pressure 80 in the space 78 behind the trailer 52 may reduce an amount of drag on the trailer 52 or on the tractor-trailer. In some examples, this higher pressure 80 in the space 78 behind the trailer 52 may reduce an amount of draft from the trailer 52 or the tractor-trailer.

As the example trailer 52 is moving forward, where the forward motion is indicated by a "Motion" arrow 14, for example as being pulled by a tractor of the tractor-trailer down a highway, areas to the left and right of the example trailer may experience ambient pressure 16 (as was the case with the traditional trailer 4 of FIG. 1). However, because of the pressurized first curtain or stream and second curtain or stream 72 of air that oppose one another in the space 78 rearward-of or behind the example trailer 52 of FIG. 2, the space 78 behind a rear surface 68 of the trailer 52 may experience higher pressure 80 and reduced draft, according to various implementations. This may provide improved fuel efficiency, for example, for vehicles that are gasoline or diesel fuel powered. This may provide improved battery-charge life or longer run periods or mileage for a given battery charge, for improved electric vehicle efficiency for electric vehicles, for example. In some examples, the generated first curtain or stream 70 and second curtain or stream 72 of pressurized air may have a height roughly equal to a height of a trailer box of the trailer 52, according to various implementations and as will be described below in reference to a slotted column or chamber that may be included with the first sub-system 56 and with the second sub-system 62.

FIG. 2 has been described above with reference to a trailer of a tractor-trailer, but in some examples, the vehicle of FIG. 2 may represent a rear of a box truck, or a rear of another type of truck. In some examples, the vehicle of FIG. 2 may represent a rear of an RV. In some examples, the vehicle of FIG. 2 may represent a rear of a bus. In some examples, the vehicle of FIG. 2 may represent a rear of a passenger vehicle, such as a rear of a car, SUV, station wagon, crossover vehicle, pickup truck, or the like.

Figure 3:
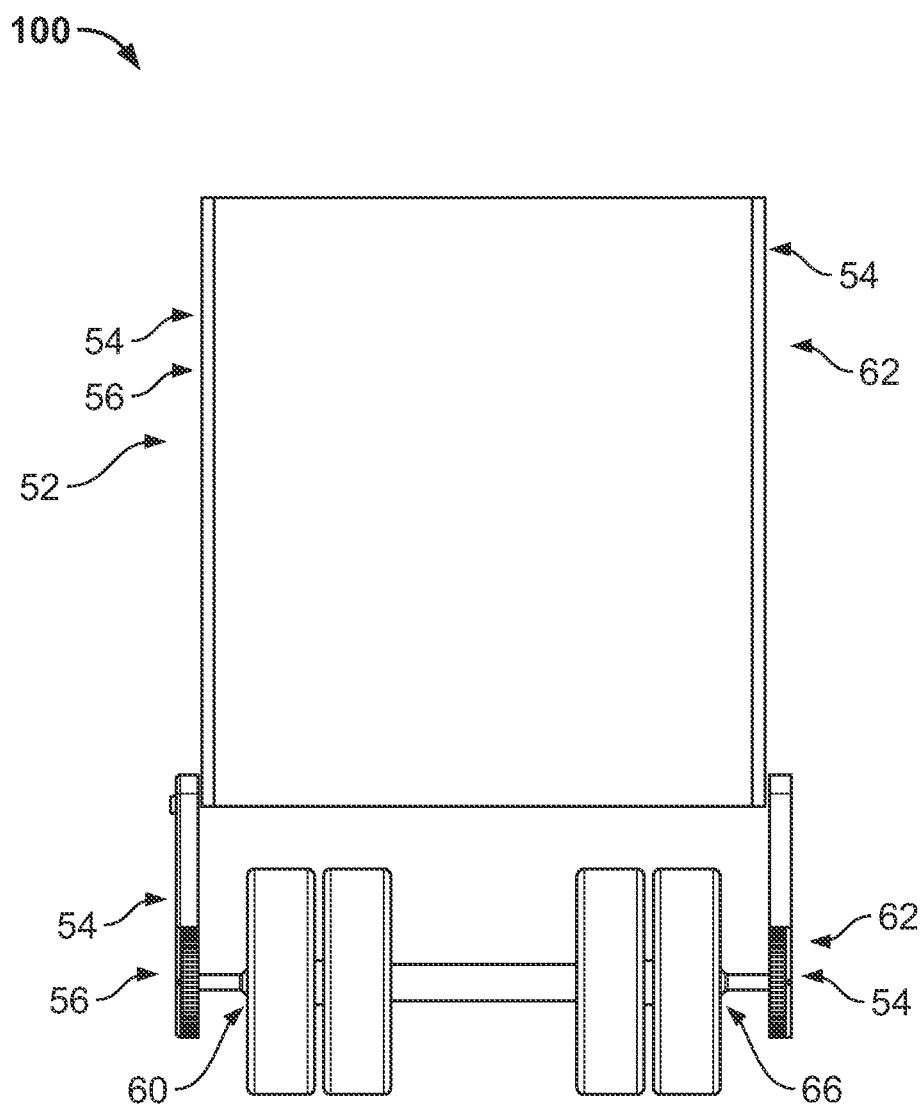
FIG. 3 is a rear view of the example trailer and the example system for improving fuel efficiency of FIG. 2.
Figure 4:
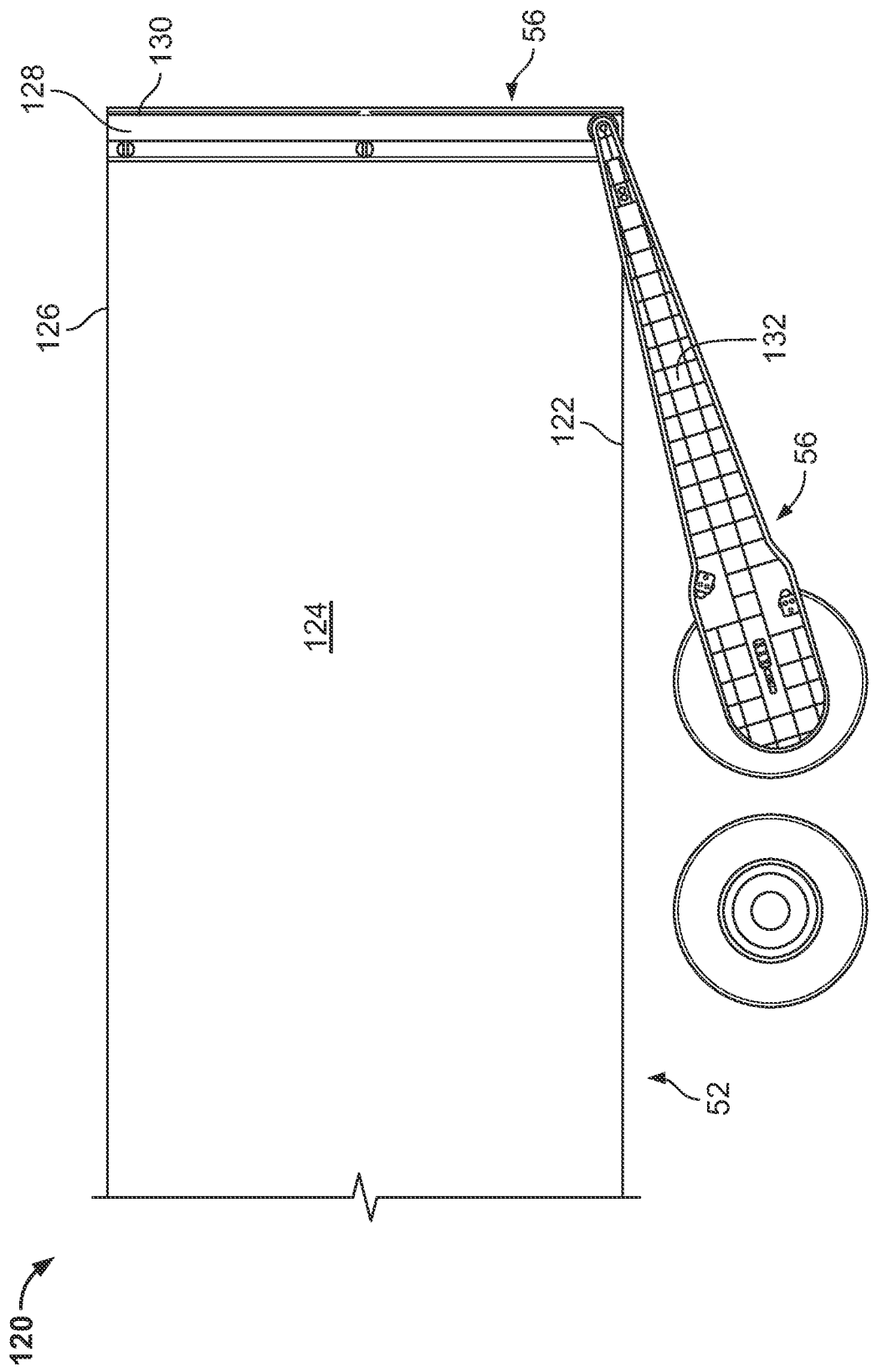
FIG. 4 is a side view of a portion of the example system for improving vehicle efficiency of FIG. 2 that is on the left side of the example trailer.

FIG. 3 is a rear view 100 of the example trailer 52 and the example system 54 for improving fuel efficiency of FIG. 2. FIG. 4 is a side view 120 of a portion of the example system 54 for improving vehicle efficiency of FIG. 2 that is on the left side of the example trailer 52. For example, FIG. 4 is a side view of the left sub-system 56 of the system 54 for improving vehicle efficiency.

As previously described, the example system 54 for improving vehicle efficiency may include a first or left sub-system 56, generally to a left side of the trailer 52, and this left sub-system 56 may generate the first curtain or stream 70 of pressurized air (see FIG. 2). The system 54 may also include a second or right sub-system 62, generally to a right side of the trailer 52, which may generate the second curtain or stream 72 of pressurized air (see FIG. 2).

As can be seen in FIG. 4, the left sub-system 56 may include, substantially near a rear of the trailer 52 and generally running from at or near a bottom or floor 122 of a trailer box 124 of the trailer 52 to at or near a top or ceiling 126 of the trailer box 124, a first column or chamber 128 that includes a first air discharge orifice 130, which in some examples may be a slot, that may be used to generate the first curtain or stream 70 of pressurized air. In a similar manner (though not visible in FIG. 4), the right sub-system 62 may include, substantially near the rear of the trailer 52 and generally running from at or near the bottom or floor 122 of the trailer box 124 of the trailer 52 to at or near the top or ceiling 126 of the trailer box 124, a second column or chamber that includes a second air discharge orifice, which in some examples may be a slot, that may be used to generate the second curtain or stream 72 of pressurized air. As can be seen in FIG. 4, the first air discharge orifice 130 extends substantially a greatest length of the first column or chamber 128 (e.g., substantially a height of the first chamber 128), and similarly the second air discharge orifice may extend substantially a greatest length of the second column or chamber. The right subsystem 62 on the right side of the trailer 52 is not shown in FIG. 4, but generally the right subsystem 62 may look similar to the left subsystem 56, but generally configured for the right side of the trailer 52.

Figure 5:
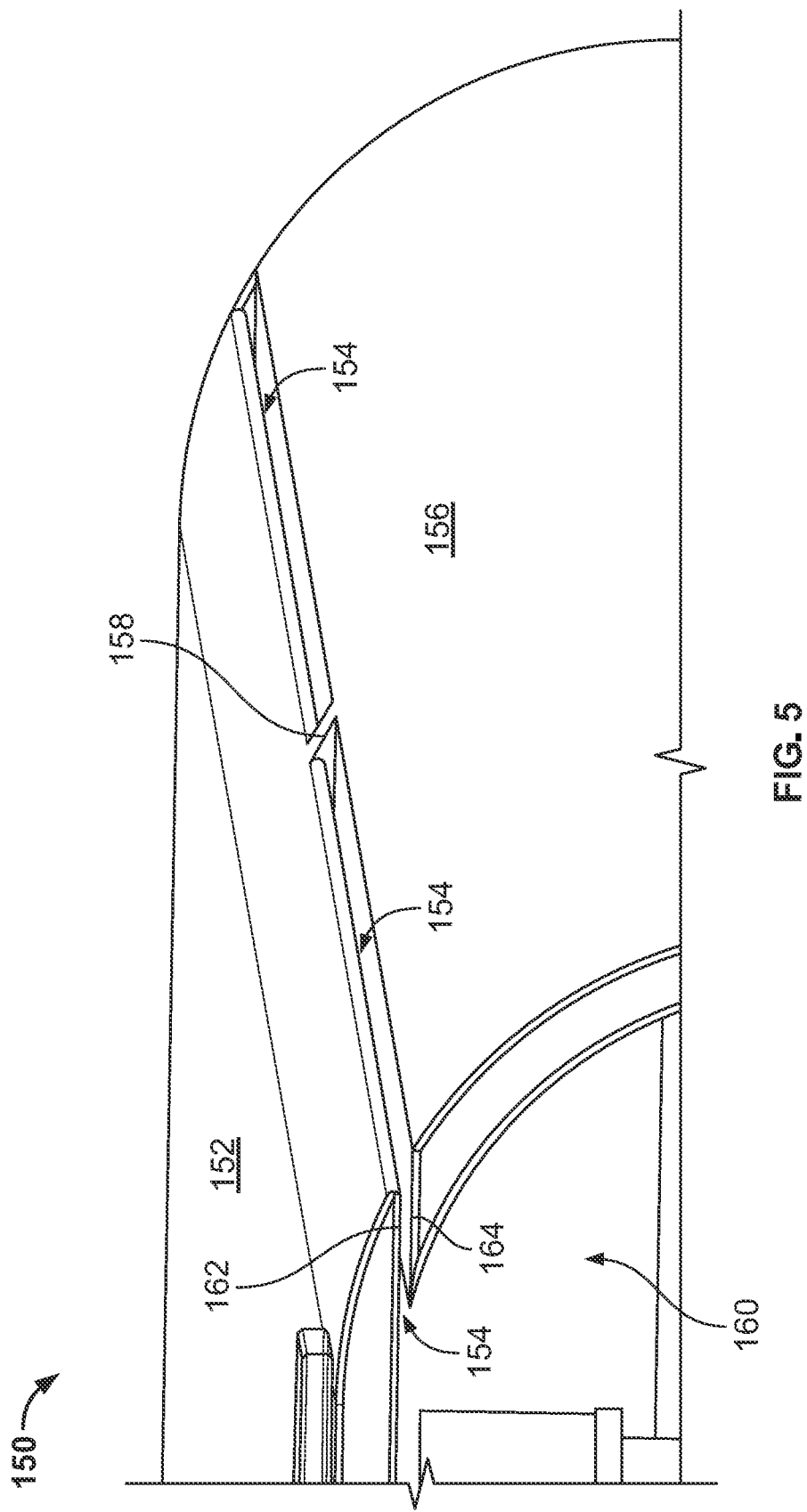
FIG. 5 is a conceptual view of a portion of an example column or chamber of an example system for improving vehicle efficiency, where the example column or chamber includes an example air discharge orifice and an example curved exterior surface.

FIG. 5 is a conceptual view 150 of a portion of an example column or chamber 152 of an example system for improving vehicle efficiency, where the example column or chamber 152 includes an example air discharge orifice 154 and an example curved exterior surface 156. In some examples, the chamber 152 may correspond to the chamber 128 of FIG. 4, and the air discharge orifice 154 may correspond to the air discharge orifice 130 of FIG. 4. In some examples, the curved exterior surface 156 may correspond to the curved exterior surface 74 of FIG. 2. For clarity, and to provide a better view of the air discharge orifice 154, the chamber 152, which may be mounted to a left side of a vehicle (e.g., to a left side of an example trailer box of a tractor-trailer), for example, is generally depicted in FIG. 5 as if said vehicle were laying on its right side.

The air discharge orifice 154 may be a slot, according to some examples. In some examples, the chamber 152 may be a slotted chamber, where the slot may act as the air discharge orifice. In the depicted example, the air discharge orifice 154 includes a reinforcing member 158, which may provide support to the air discharge orifice 154. In some examples, one or more additional reinforcing members 158 may be used, and in some examples the reinforcing member 158 may be omitted. The air discharge orifice 154 may permit pressurized air within the chamber 152 to exit the chamber 152. For example, pressurized air in a space 160 interior of the chamber 152 may exit the chamber 152 via the air discharge orifice 154. The chamber 152 may define the space 160 interior of the chamber, for example.

In some examples, the air discharge orifice 154 may be defined by an example outer air guide 162, which may define an outer boundary of the orifice 154, and by an example inner air guide 164, which may define an inner boundary of the orifice 154, and each of which may guide the pressurized air just before the pressurized air exits the chamber 152. The outer air guide 162 and the inner air guide 164 may generally direct the pressurized air that is about to exit the chamber 152 in a rearward direction with respect to forward motion of the vehicle, for example. For example, with reference again to FIG. 2 and for a vehicle moving forward, as indicated by the "Motion" arrow 14 directed toward the top of the page in the top view 50 of FIG. 2, the pressurized air may be directed generally rearward or opposite of the direction of motion 14 by the air discharge orifice just before the pressurized air leaves the chamber, which would be in a direction towards the bottom of the page in the top view 50 of FIG. 2.

Referring again to FIG. 5, as the pressurized air exits the chamber 152 via the air discharge orifice 154, the pressurized air may follow the curved exterior surface 156 of the chamber. For example, the pressurized air, which had been directed in a rearward direction by the air discharge orifice 154 just prior to exit from the chamber, may upon exit from the chamber 152 follow the curved external surface 156 of the chamber 152 to wrap around a rear left edge of the vehicle (e.g., around a rear left edge of a trailer box of a tractor-trailer), and may proceed generally in a left-to-right direction along the rear surface of the vehicle (e.g., along the rear surface of the trailer box).

The curved exterior surface 156 may have a convex shape in some examples. The curved exterior surface 156 may have a quarter-circle shape in some examples. For example, the curved surface 156 may have a profile that approximates one-quarter of a circle. In some examples, a line that is tangent to the curved surface 156 at a rearward edge of the curved surface 156 may be generally parallel to a rear surface of a vehicle to which the chamber 152 is attached, such as generally parallel to a rear surface of a trailer box of a tractor-trailer.

In some examples, the chamber 152 may have a greatest length approximately equal to a height of the trailer box of the tractor trailer. In some examples, the air discharge orifice 154 may have a greatest length approximately equal to a greatest length of the chamber 152, or in some examples approximately equal to a height of the trailer box. In some examples, the air discharge orifice 154 may have a greatest length approximately equal to a greatest length of the chamber 152, or approximately equal to a height of the trailer box in some examples, although the air discharge orifice 154 may include one or more reinforcement members 158 for structural rigidity, for example.

In some examples, the chamber 152 may be about nine feet long, and may generally extend from at or near a bottom of the trailer box to at or near the top of the trailer box (that is, may span substantially the entire height of the trailer box), at or near the rear of the trailer, and the air discharge orifice 154 may similarly extend substantially the entire height of the trailer box or nearly the entire height of the trailer box, according to some implementations. In some examples, the air discharge orifice 154 may have a greatest length that is less that a greatest length of the chamber 152.

As the pressurized air exits the chamber via the air discharge orifice, generally along the height of the trailer box, a first curtain or stream of pressurized air may be generated, and may follow the curved outer surface of the chamber based on the Coanda Effect, and may continue along a rear surface of the trailer, in a left-to-right direction. For example, see the left arrow of FIG. 2, which may indicate the air flow, and may generally indicate a curtain or stream of air flow having a height generally similar to a height of the trailer box. Similarly, the second or right sub-system on the right side of the trailer may generate a second curtain or stream of pressurized air that may follow a curved surface of a chamber of the right sub-system, based on the Coanda Effect, and may continue along a rear surface of the trailer, in a right-to-left direction. For example, see the right arrow of FIG. 2, which may indicate the air flow, and may generally indicate a curtain or stream of air flow having a height generally similar to a height of the trailer box.

In this manner, the two generated curtains or streams of pressurized air may oppose one another behind the trailer, and may pressurize a space behind or rearward of the trailer. For example, the space behind a rear surface of the trailer may experience higher pressure and reduced draft, according to various implementations. In some examples, this may lead to reduced drag on the trailer or vehicle. One or more of these benefits, in some examples, may lead to improved fuel efficiency, for example, for vehicles that are gasoline or diesel fuel powered, or may lead to improved battery life or improved electric vehicle efficiency for electric vehicles, for example.

In some examples, the system 54 for improving vehicle efficiency uses energy from rotating wheels of the vehicle (e.g., as the vehicle is in motion down the road) to drive one or more pulleys. In some examples, an example pulley drives an example shaft of an example impeller, where the impeller includes a plurality of example blades that are interior of the chamber, and the rotating shaft causes the blades to rotate and pull air from outside the chamber into the chamber, and pressurize the air within the chamber.

Figure 6:
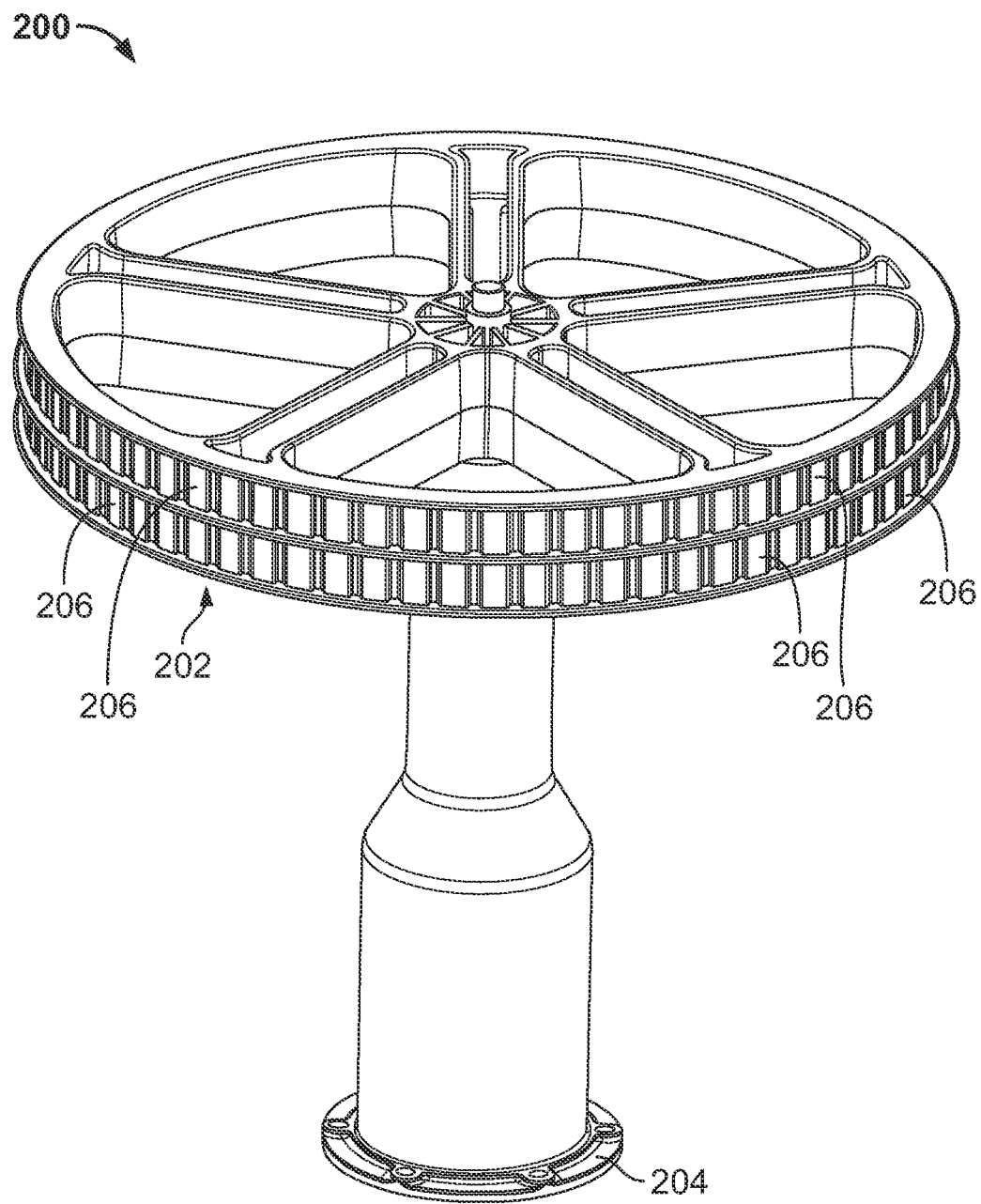
FIG. 6 is a perspective view of an example drive pulley.
Figure 7:
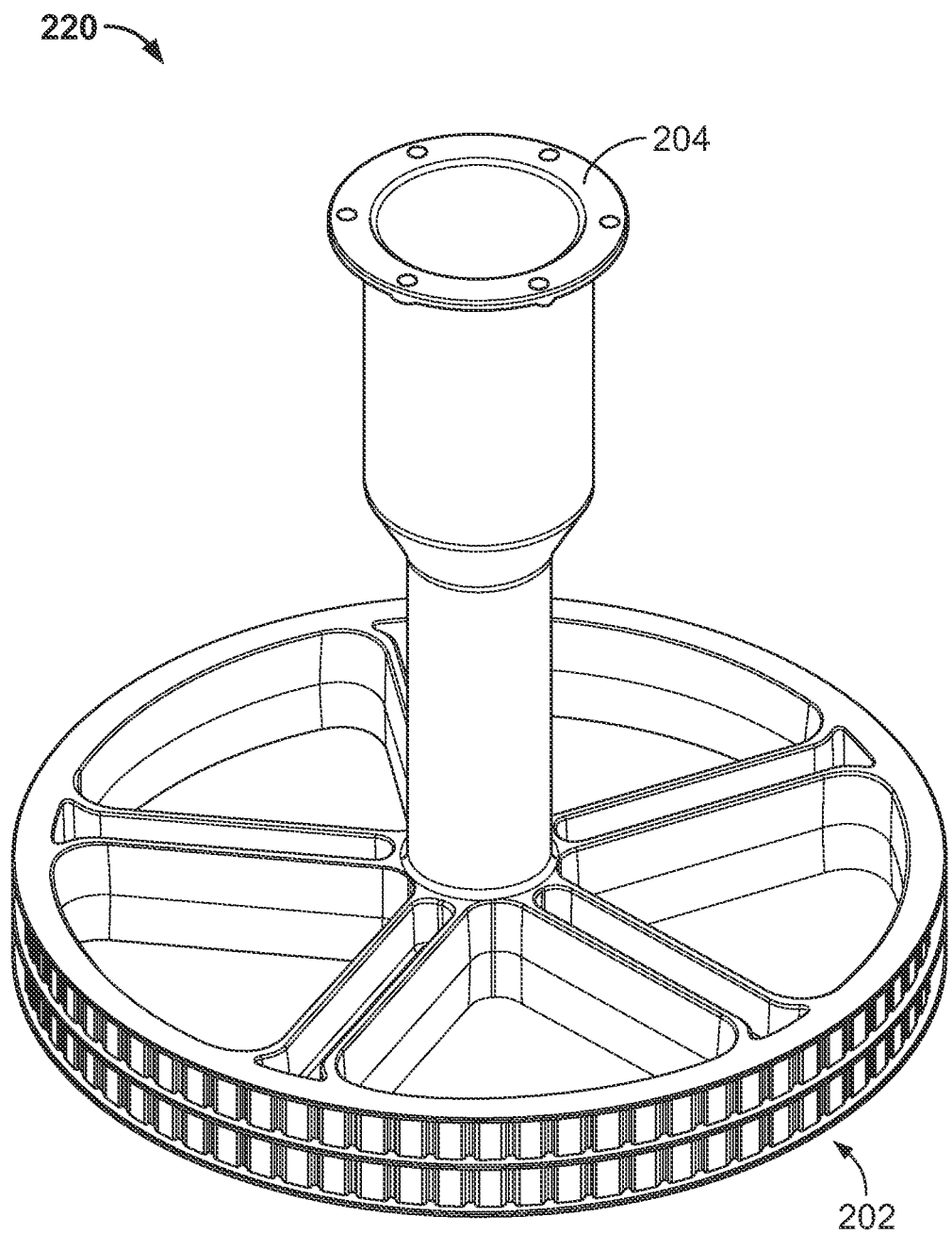
FIG. 7 is another perspective view of the drive pulley of FIG. 6.
Figure 8:
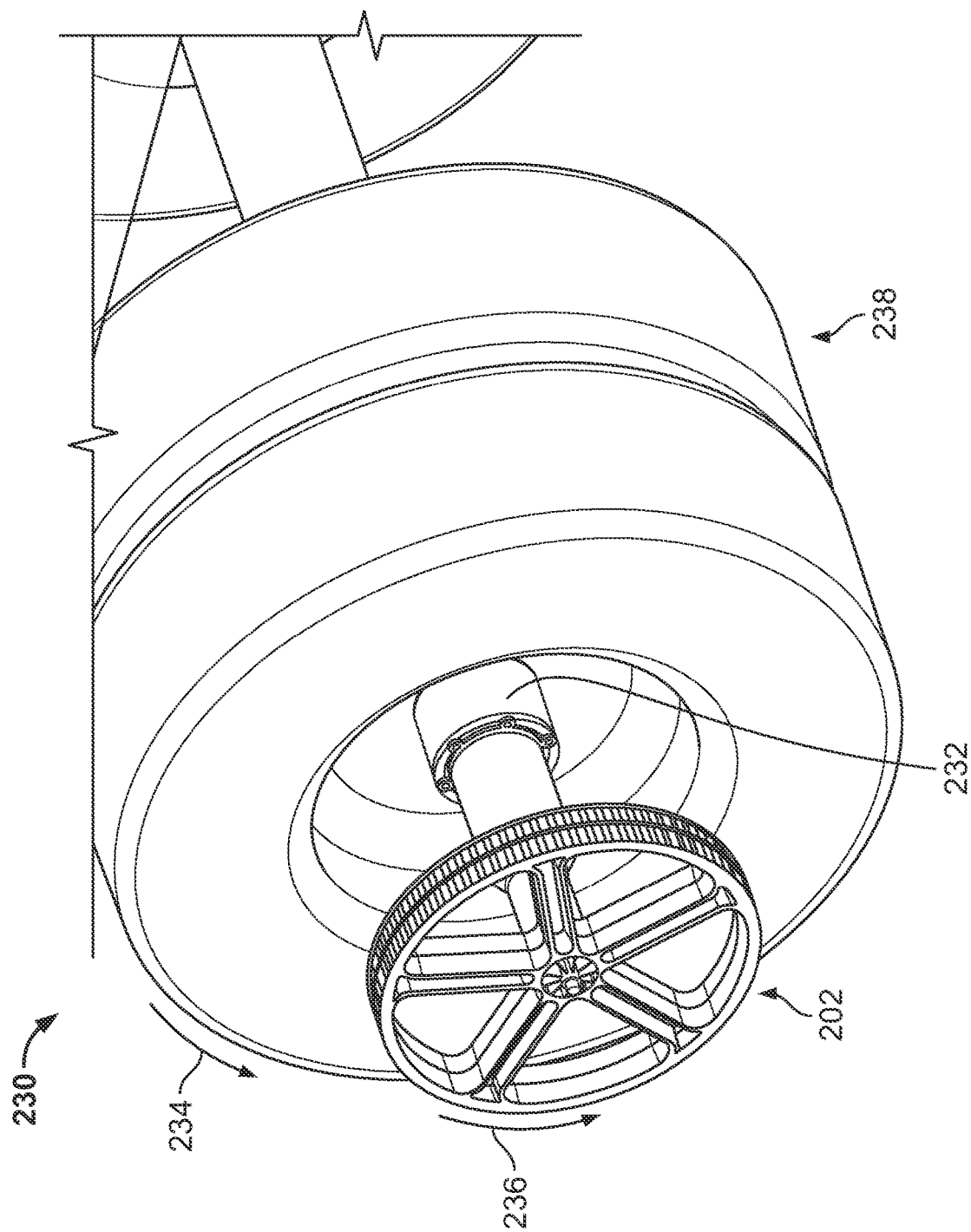
FIG. 8 is a perspective view of the drive pulley of FIG. 6 bolted to a wheel of a vehicle.
Figure 9:
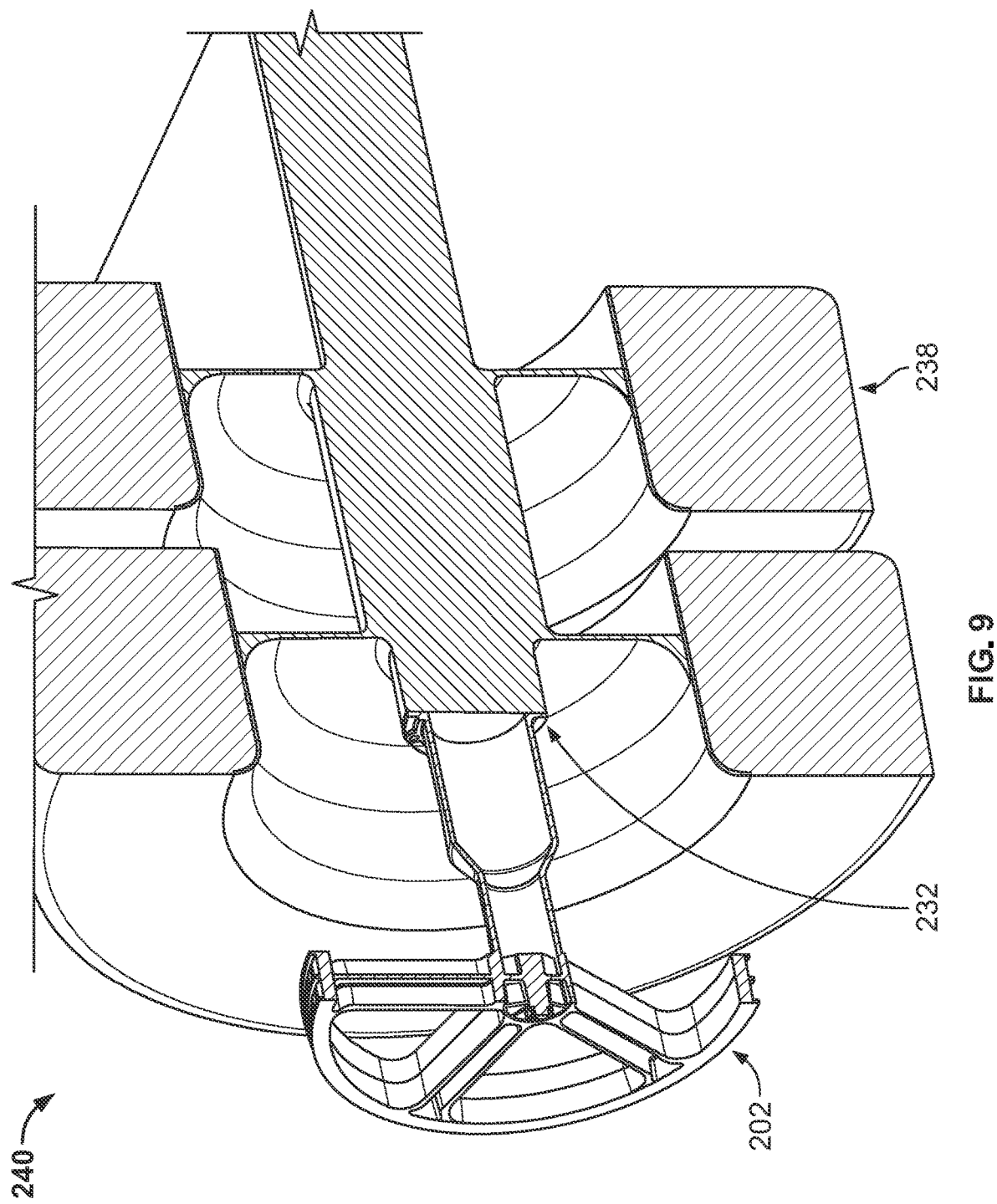
FIG. 9 is a perspective cutaway view of the drive pulley and wheel of FIG. 8.

In some examples, each of the first and second sub-systems 56, 62 may include an example drive pulley that may attach to a wheel of the trailer 52 or other vehicle. FIG. 6 is a perspective view 200 of an example drive pulley 202. FIG. 7 is another perspective view 220 of the drive pulley 202 of FIG. 6. The drive pulley 202 includes a mounting plate 204 that can be used to mount the drive pulley 202 to a wheel of a vehicle. FIG. 8 is a perspective view 230 of the drive pulley 202 bolted to a wheel 232 of a vehicle. In some examples, the wheel 232 may be a rear wheel of the vehicle. In some examples, the wheel 232 may correspond to the left rear wheel 60 of FIG. 2 and FIG. 3. As the tire and wheel 232 rotate 234 as the vehicle moves forward, the drive pulley 202 rotates 236 in the same direction because it is attached to the wheel 232. In the example of FIG. 8, an inside rear tire and wheel 238 is also shown, and in some examples the inside rear tire and wheel 238 may represent an inside wheel on a trailer of a tractor trailer, or an inside wheel on another vehicle. FIG. 9 is a perspective cutaway view 240 of the drive pulley 202 and wheel 232 of FIG. 8.

The example drive pulley 202 includes a plurality of cogs 206 for engaging a belt, such as an example cogged belt, according to various implementations. In some examples, the cogged belt may be a timing belt. In some examples, the drive pulley 202 may not include cogs, and may be configured to engage with a non-cogged belt, for example.

As can be appreciated with reference to FIGS. 6 and 7, the example drive pulley 202 may be configured to accommodate two belts, such as a first belt and a second belt, in this example. In some examples, two belts may be used for redundancy, which may increase safety, according to various implementations. For example, if one of the two belts were to fail, the system may continue to operate with the other belt. In some examples, a single belt may be used. In some examples, a drive pulley that is configured for a single belt may be used.

Figure 10:
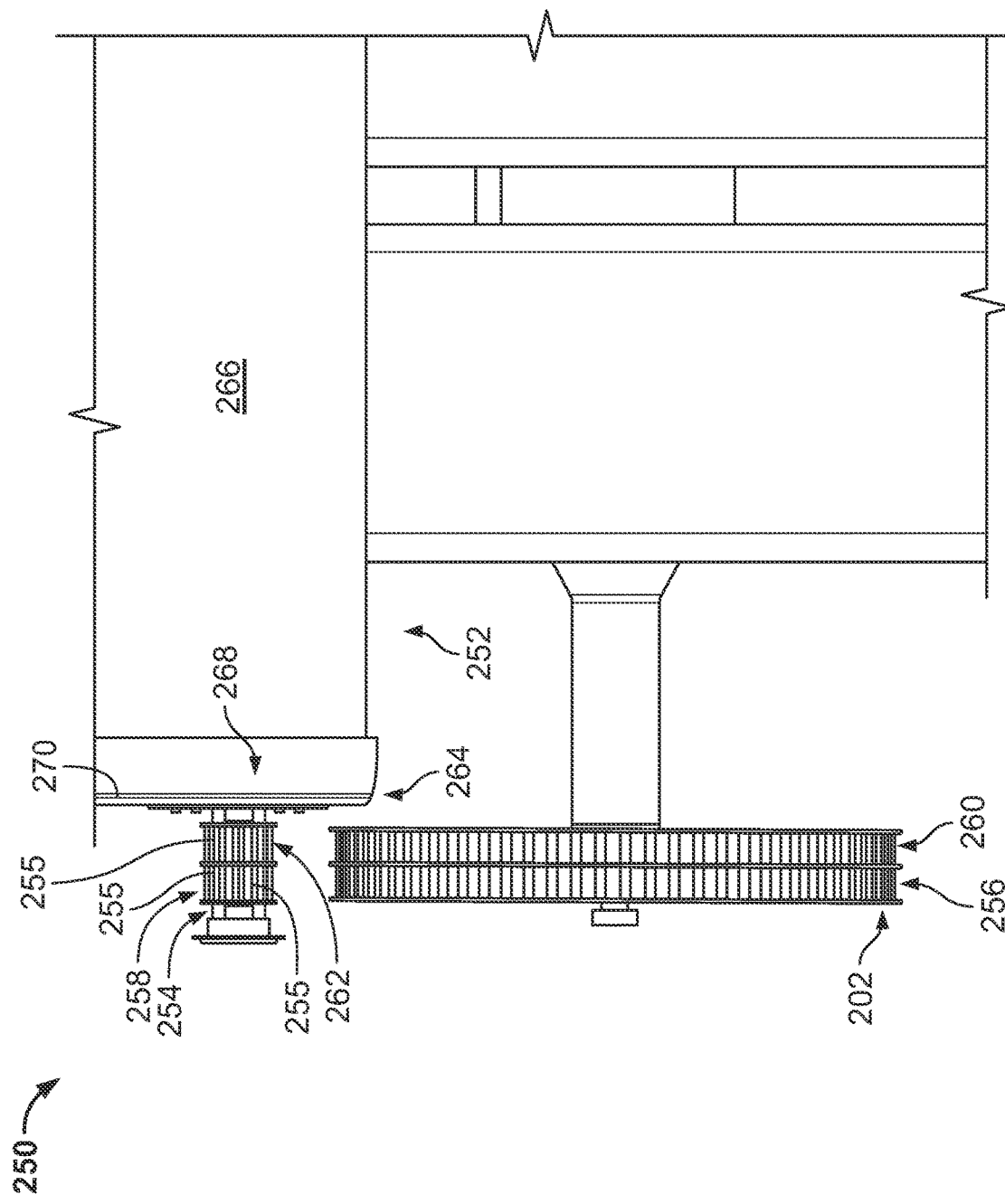
FIG. 10 is a rear view of a left side of an example trailer with the drive pulley of FIG. 6 and an example driven pulley that may be attached to the left side of the trailer, near a rear of the trailer.

FIG. 10 is a rear view 250 of a left side of an example trailer 252 with the drive pulley 202 of FIG. 6 and an example driven pulley 254 that may be attached to the left side of the trailer 252, near a rear of the trailer 252. In some examples, the driven pulley 254 may be attached to a chamber of a system for improving vehicle efficiency, for example. The driven pulley 254 includes a plurality of cogs 255 for engaging a belt, such as an example cogged belt, according to various implementations. In some examples, the cogged belt may be a timing belt. In some examples, the driven pulley 254 may not include cogs, and may be configured to engage with a non-cogged belt, for example.

The drive pulley 202 may be attached to an example wheel of the trailer 252. The driven pulley 254 may be generally aligned with the drive pulley 202, according to various implementations. In the depicted example of FIG. each of the drive pulley 202 and the driven pulley 254 are configured to accommodate two belts. For example, a primary belt (not shown in FIG. 10) may engage an outer portion 256 of the drive pulley 202 and may engage an outer portion 258 of the driven pulley 254, and a redundant belt (not shown in FIG. 10) may engage an inner portion 260 of the drive pulley 202 and may engage an inner portion 262 of the driven pulley 254. In some examples, each of the primary belt and the redundant belt may couple the drive pulley 202 to the driven pulley 254.

Also shown in FIG. 10 is an example chamber 264 that may be attached to a left side of an example trailer box 266 of the trailer 252, where the example chamber 264 includes an example curved exterior surface 268 and an example air discharge orifice 270. When the driven pulley 254 is driven by the drive pulley 202 via the one or more belts (not shown), the driven pulley 254 may cause a shaft of an impeller to rotate, and the rotating impeller shaft may cause a plurality of impeller blades, which may be interior of the chamber 264, to rotate. In some examples, the rotating impeller blades may cause air to be pulled into the chamber 264 via an air intake opening of the chamber and become pressurized within the chamber 264. In some examples, the chamber 264 may correspond to the chamber 128 of FIG. 4 or the chamber 152 of FIG. 5. In some examples, the curved exterior surface 268 may correspond to the curved exterior surface 74 of FIG. 2 or the curved exterior surface 156 of FIG. 5. In some examples, the air discharge orifice 270 may correspond to the air discharge orifice 130 of FIG. 4 or the air discharge orifice 154 of FIG. 5.

Figure 11:
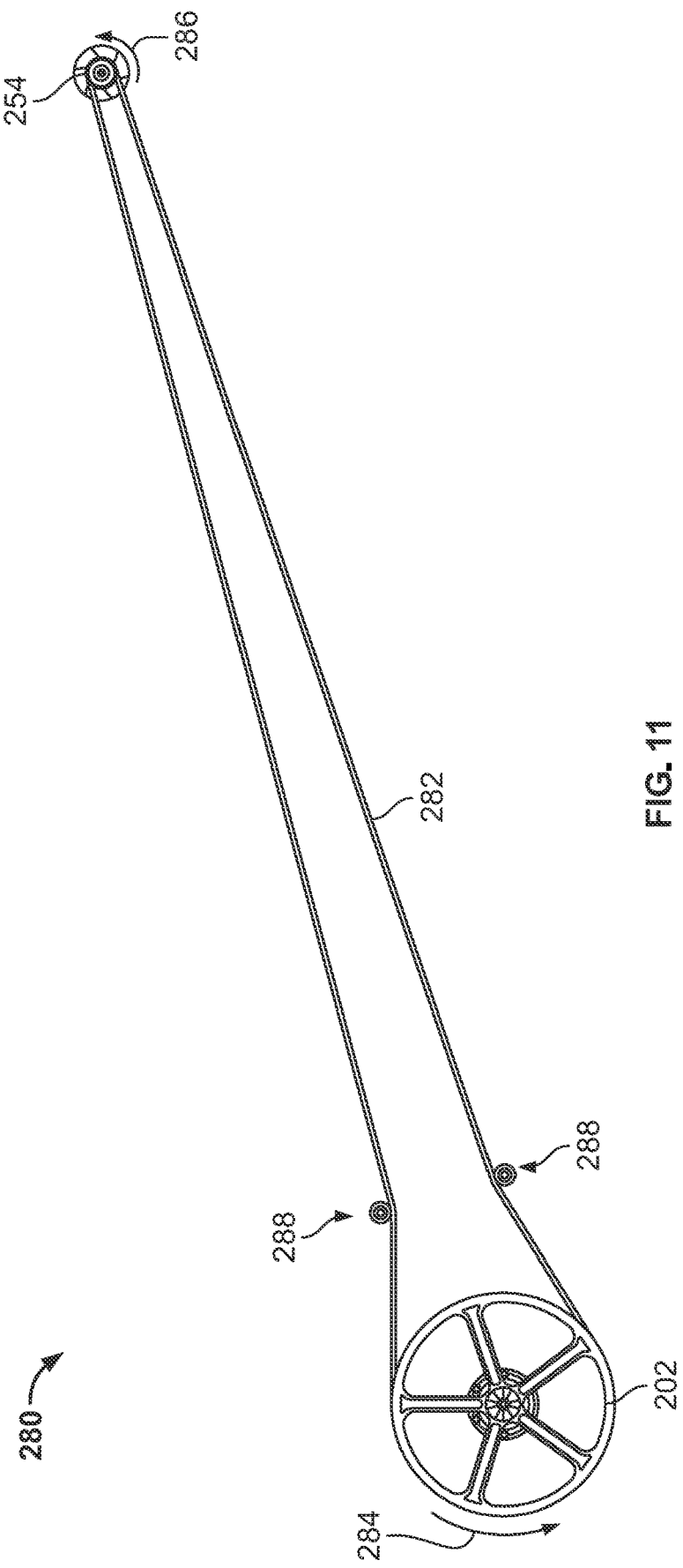
FIG. 11 is a conceptual side view isolating the drive pulley and driven pulley of FIG. 10, and shows an example belt that may couple the drive pulley to the driven pulley.

FIG. 11 is a conceptual side view 280 isolating the drive pulley 202 and driven pulley 254 of FIG. 10, and shows an example belt 282 that may couple the drive pulley 202 to the driven pulley 254. In the example of FIG. 11, only a single belt 282 is depicted for simplicity, but in some examples a second belt may also be used to couple the drive pulley 202 to the driven pulley 254, as previously described. In some examples, the belt 282 may be a cogged belt. In some examples, the belt 282 may be a non-cogged belt.

In operation, as a wheel (not shown in FIG. 11 for simplicity) to which the drive pulley 202 may be attached rotates, the drive pulley 202 may also rotate 284, and may provide a force to the belt 282 to cause the belt to rotate, and the belt 282 may provide a force to the driven pulley 254 to cause the driven pulley 254 to rotate 286. In some examples, a ratio of the drive pulley 202 to the driven pulley 254 may be about 18:1. Alternatively, in some examples any appropriate ratio between the drive pulley 202 and the driven pulley 254 may be used.

Figure 12:
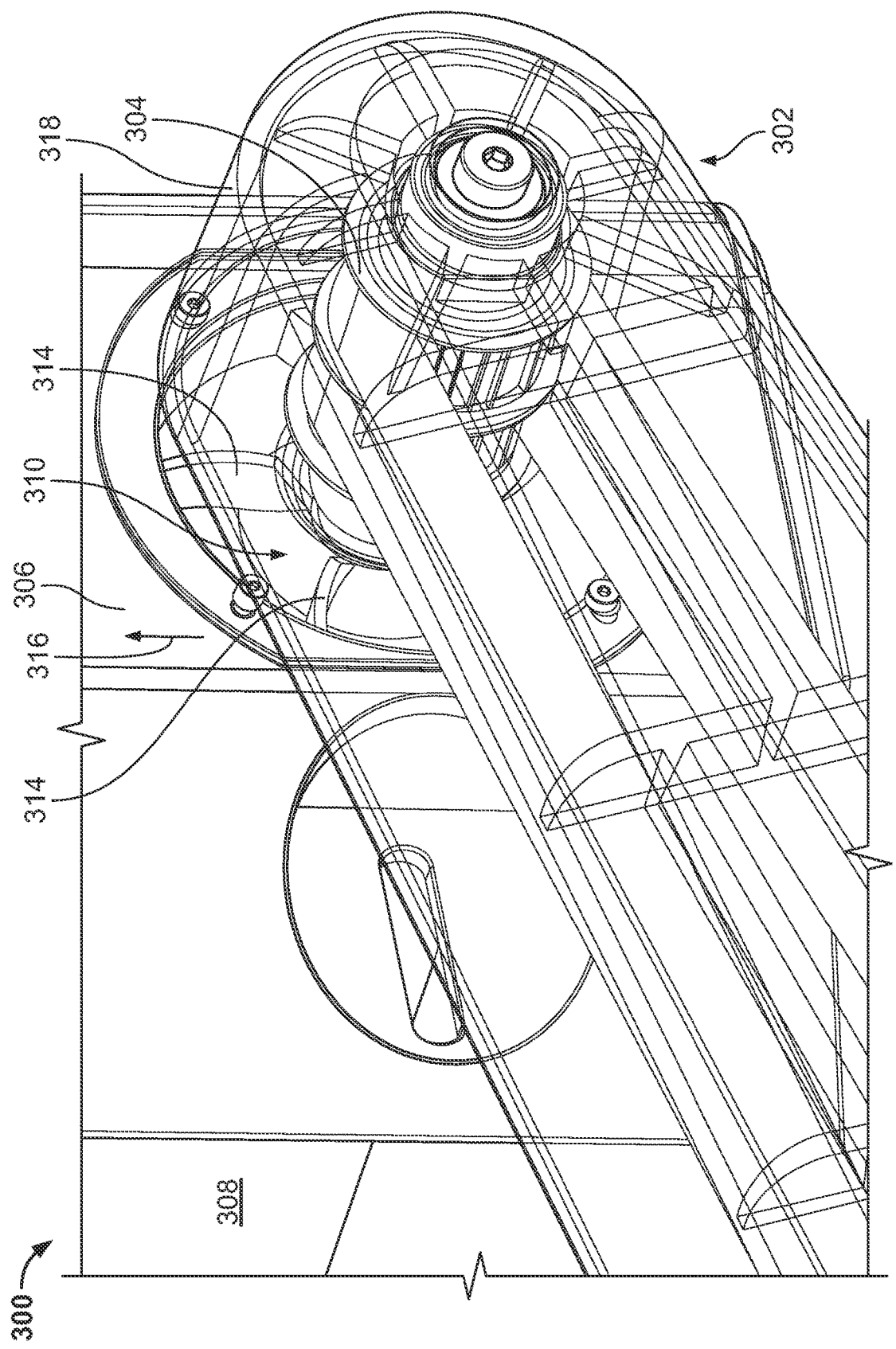
FIG. 12 is a conceptual perspective view of a portion of an example system for improving vehicle efficiency.
Figure 13:
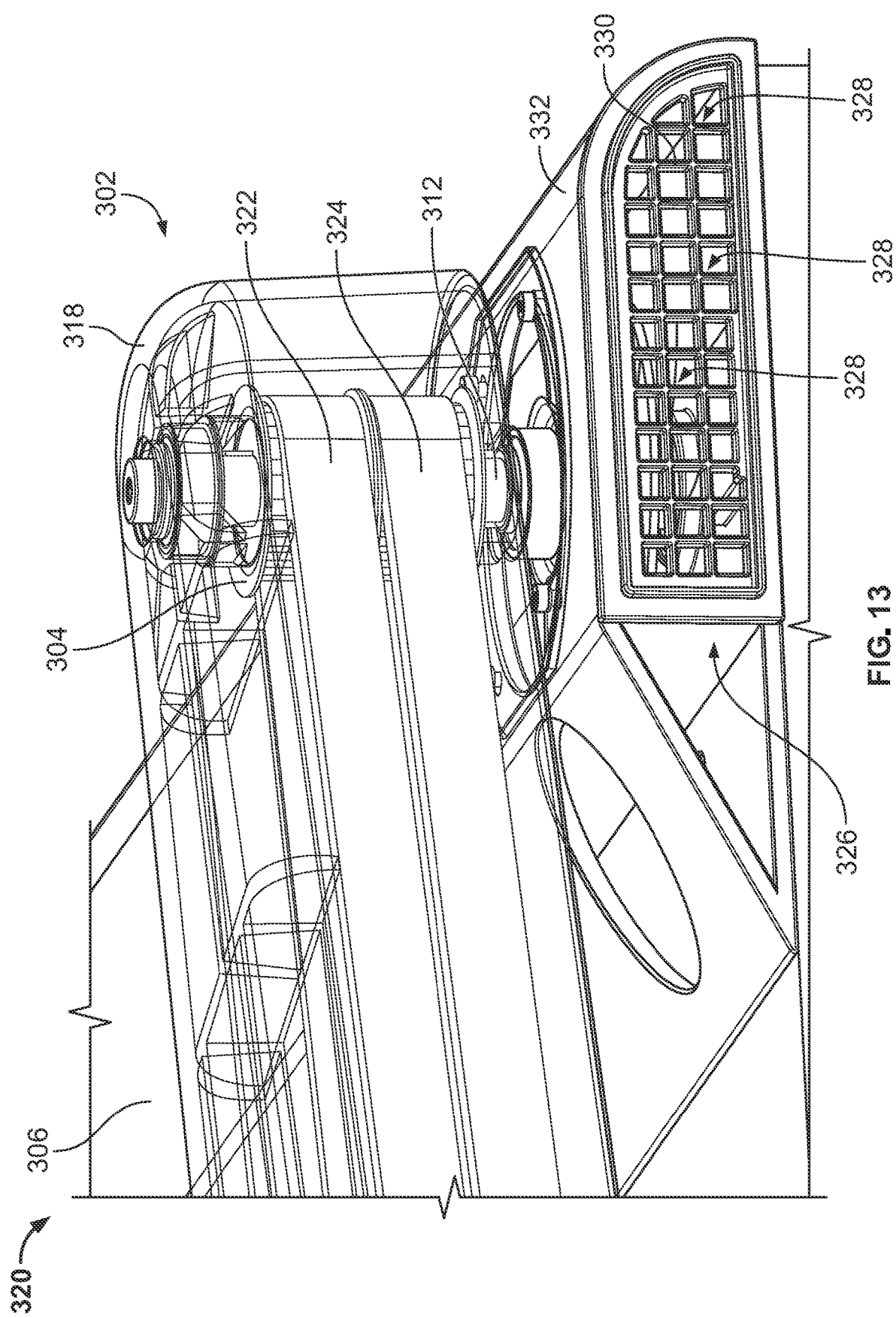
FIG. 13 is another conceptual perspective view of the portion of the system for improving vehicle efficiency of FIG. 12.

FIG. 12 is a conceptual perspective view 300 of a portion 302 of an example system for improving vehicle efficiency. Shown in FIG. 12 is an example driven pulley 304 and an example chamber 306 that is attached to a side 308 of a vehicle. FIG. 13 is another conceptual perspective view 320 of the portion 302 of the system for improving vehicle efficiency, this time providing a view of a bottom of the chamber 306. As can be best seen in the view 320 of FIG. 13, a primary belt 322 and a redundant belt 324 may be coupled to the driven pulley 304, and as can be appreciated with reference to FIG. 10, each of the belts 322, 324 may also be coupled to a drive pulley, such as the drive pulley 202, as previously described. In some examples a single belt, such as belt 322 or belt 324, may be used. In some examples, the chamber 306 may correspond to the chamber 264 of FIG. 10, or the chamber 128 of FIG. 4, or the chamber 152 of FIG. 5. In some examples, the driven pulley 304 may correspond to the driven pulley 254 of FIG. 10. In some examples, the belts 322, 324 may be cogged belts. In some examples, the belts 322, 324 may be non-cogged belts.

Also shown in FIG. 12 is an example impeller 310, which is attached in this example to the chamber 306, near a bottom of the chamber 306. The impeller 310 includes an example shaft 312 and a plurality of example impeller blades 314. As shown in FIG. 12, the impeller 310 is positioned relative to the chamber 306 such that the impeller blades 314 are oriented to drive air generally upward 316 within the chamber 306. In some examples, the impeller 310 may have a vertical orientation. In some examples, as the shaft 312 of the impeller is rotated, the blades 314 of the impeller may be driven and caused to rotate. The impeller blades 314 may drive air in an upward direction 316 within the chamber 306, and the air may be pressurized within the chamber 306. The air may exit the chamber 306 via an air discharge orifice, for example, as has been previously described herein.

Referring again to FIG. 13, a bottom portion 326 of the chamber 306 may include an example air intake opening 328, through which air from outside of the chamber 306 may be drawn into the chamber 306, according to various implementations. For example, as the blades 314 of the impeller 310 rotate, air may be pulled into the chamber 306 via the air intake opening 328. In some examples, there may be more than one air intake opening 328 of the chamber 306. In some examples, the air intake opening 328 may be near a bottom of the chamber 306. In the depicted example of FIG. 13, an example debris guard 330 that includes a plurality of apertures is included at the air intake opening 328. In some examples, the debris guard 330 may prevent stones, rocks, leaves, litter, debris, or other objects from entering the chamber 306 via the air intake opening 328, yet may permit air to enter the chamber 306 via the air intake opening 328. As the impeller blades 314 rotate within the chamber 306, air may be pulled into the chamber 306 via the air intake opening 328 through the apertures in the debris guard 330, and the air bay be driven upward 316 within the chamber 306 by the rotating impeller blades 314, for example.

The chamber 306 includes an example curved external surface 332, as can be seen to the right in FIG. 13. In some examples, this curved surface 332 may generally extend a greatest length of the chamber 306. In some examples, the curved surface 332 may correspond to the curved surface 74 of FIG. 2. In some examples, the curved surface 332 may correspond to the curved surface 156 of FIG. 5. In some examples, the curved surface 332 may correspond to the curved surface 268 of FIG. 10.

Figure 14:
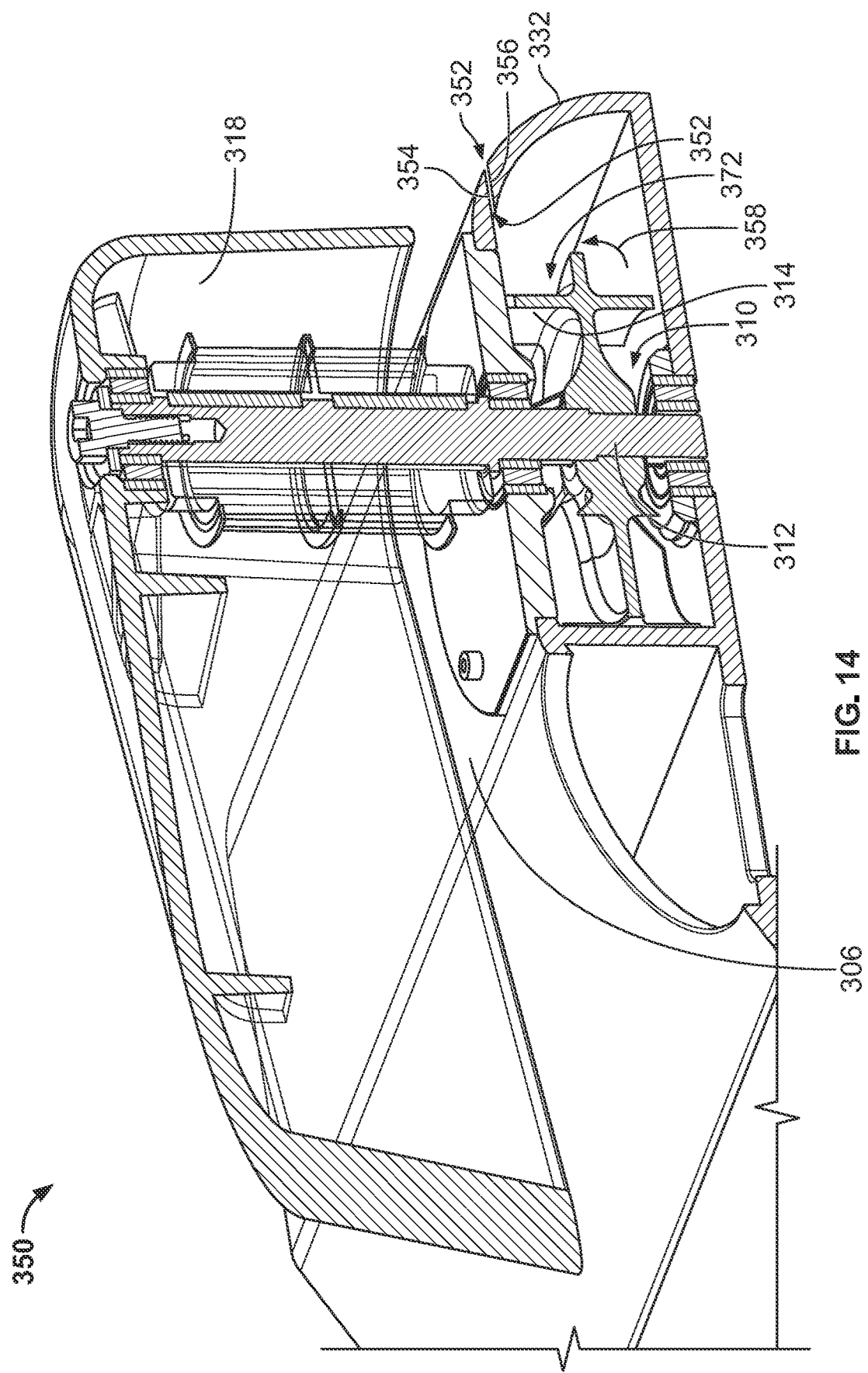
FIG. 14 is a perspective cutaway view of the portion of the system for improving vehicle efficiency of FIG. 12.
Figure 15:
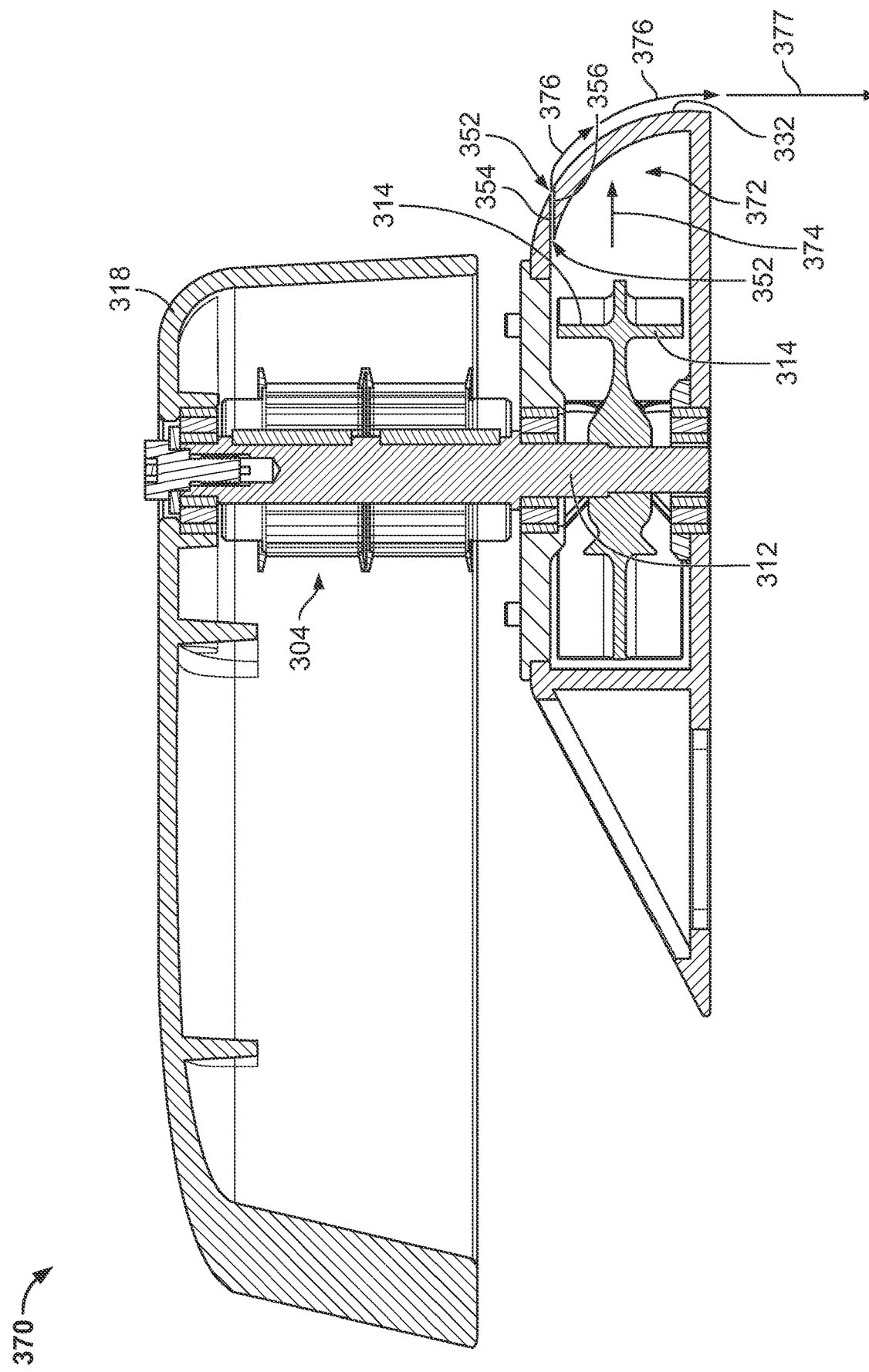
FIG. 15 is a bottom cutaway view of the portion of the system for improving vehicle efficiency of FIG. 12.

FIG. 14 is a perspective cutaway view 350, and FIG. 15 is a bottom cutaway view 370 of the portion 302 of the system for improving vehicle efficiency of FIG. 12. Generally, the portion 302 may be part of a left sub-system of a system for improving vehicle efficiency, which may be mounted to a left side of a trailer or other vehicle, for example. FIGS. 14 and 15 depict an example air discharge orifice 352, which as described above with reference to other examples discussed herein, may permit pressurized air in an example space 372 interior of the chamber 306 to exit the chamber 306. The air discharge orifice 352 may be defined by an example outer air guide 354, which may define an outer boundary of the orifice 352, and by an example inner air guide 356, which may define an inner boundary of the orifice 352, and each of which may guide the pressurized air just before the pressurized air exits the chamber 306. The outer air guide 354 and the inner air guide 356 may generally direct the pressurized air that is about to exit the chamber 306 in a rearward direction 374 with respect to forward motion of the vehicle, for example. As the pressurized air exits the chamber 306 via the air discharge orifice 352, the pressurized air may follow 376 the curved exterior surface 332 of the chamber 306. For example, the pressurized air may proceed along the curved surface 332, as depicted by arrow 376, may wrap around a rear edge of the trailer or vehicle, and may continue generally along a rear surface of the trailer or vehicle, as depicted by arrow 377, and as previously described herein.

The view 350 of FIG. 14 shows the impeller 310 and the impeller blades 314. In operation the blades 314 may rotate 358, and may draw air from outside of the chamber 306 into the chamber 306 via the air intake opening 328 (for example, through apertures in the debris guard 330 for an air intake opening that includes a debris guard 330). In this manner, air from outside of the chamber 306 may be drawn into the space 372 interior of the chamber 306, may be pressurized within the chamber 306, and may exit the chamber 306 via the air discharge orifice 352.

Figure 16:
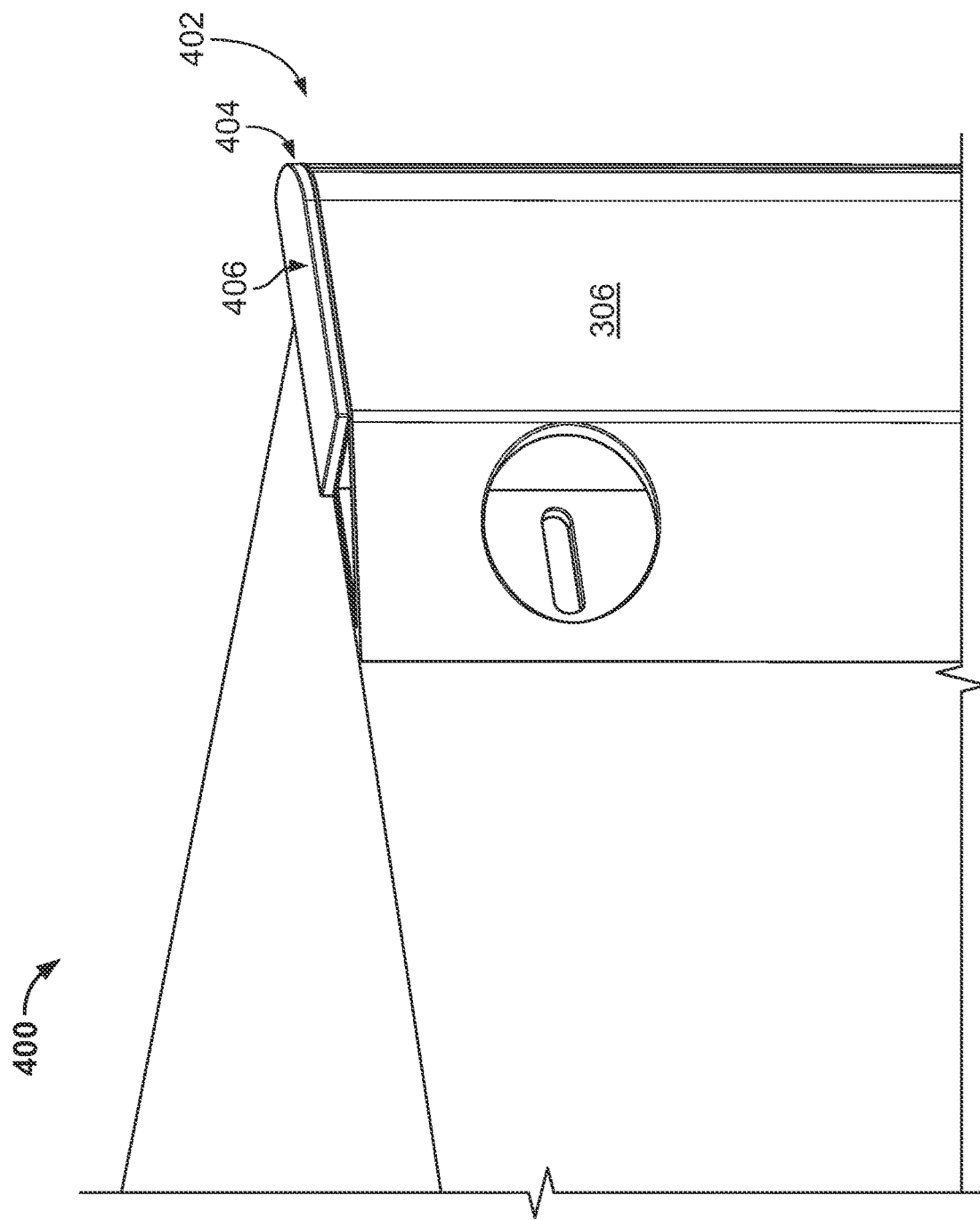
FIG. 16 is a perspective view of an example top portion of the chamber of FIGS. 12-15.

FIG. 16 is a perspective view 400 of an example top portion 402 of the chamber 306 of FIGS. 12-15. As can be seen in FIG. 16, a top 404 of the chamber 306 is closed or capped. In the depicted example, a cap 406 or cover is shown capping the chamber 306, and the cap 406 may prevent air from escaping the chamber 306 at the top 404 of the chamber 306. Generally, the chamber 306 may be closed or bounded except for the previously described air intake opening 328 and the air discharge orifice 352, according to various implementations.

Figure 17:
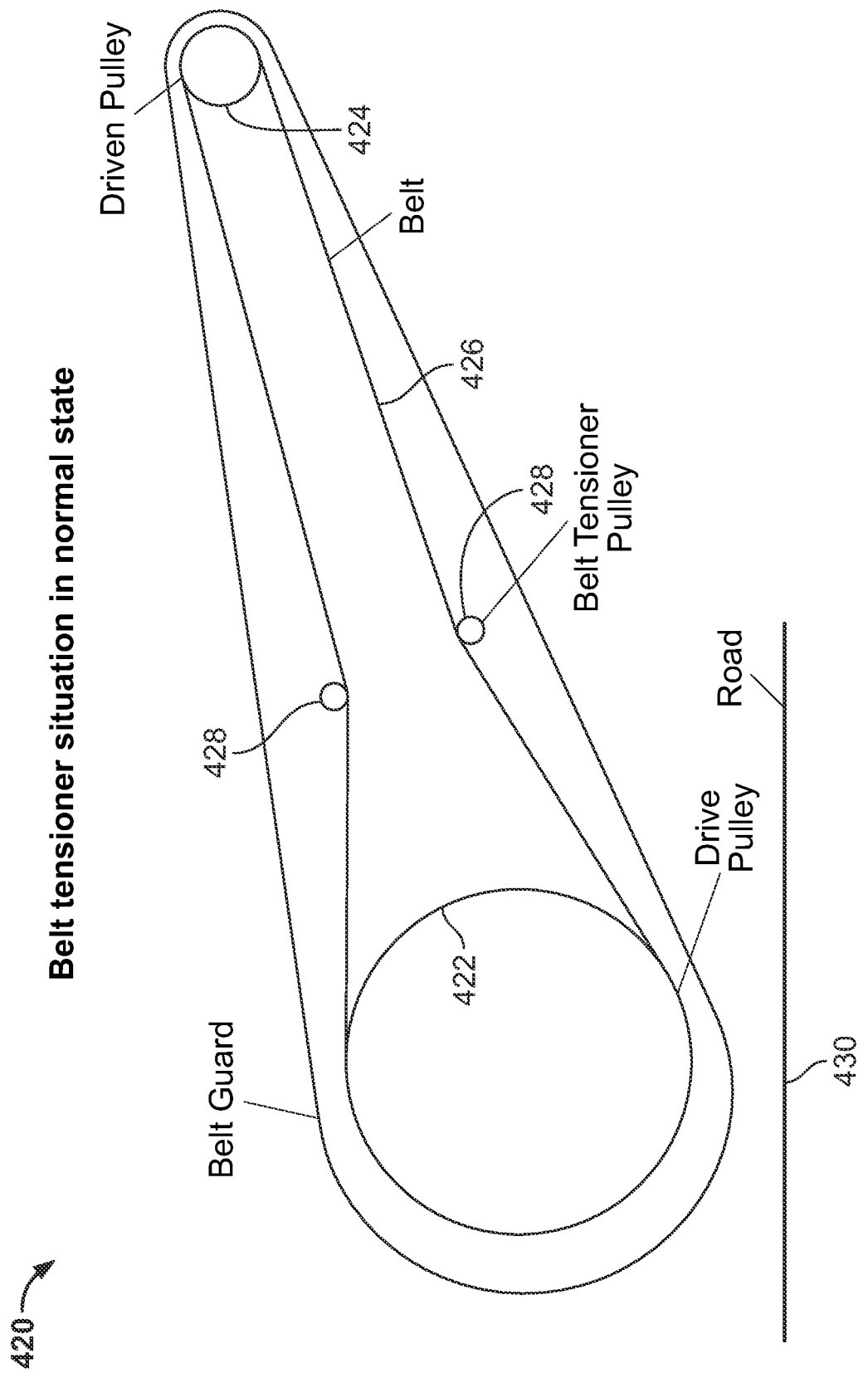
FIGS. 17-19 are conceptual diagrams that depict example situations, and show how vertical movement of a wheel of a vehicle to which s drive pulley may be attached may affect system operation.
Figure 18:
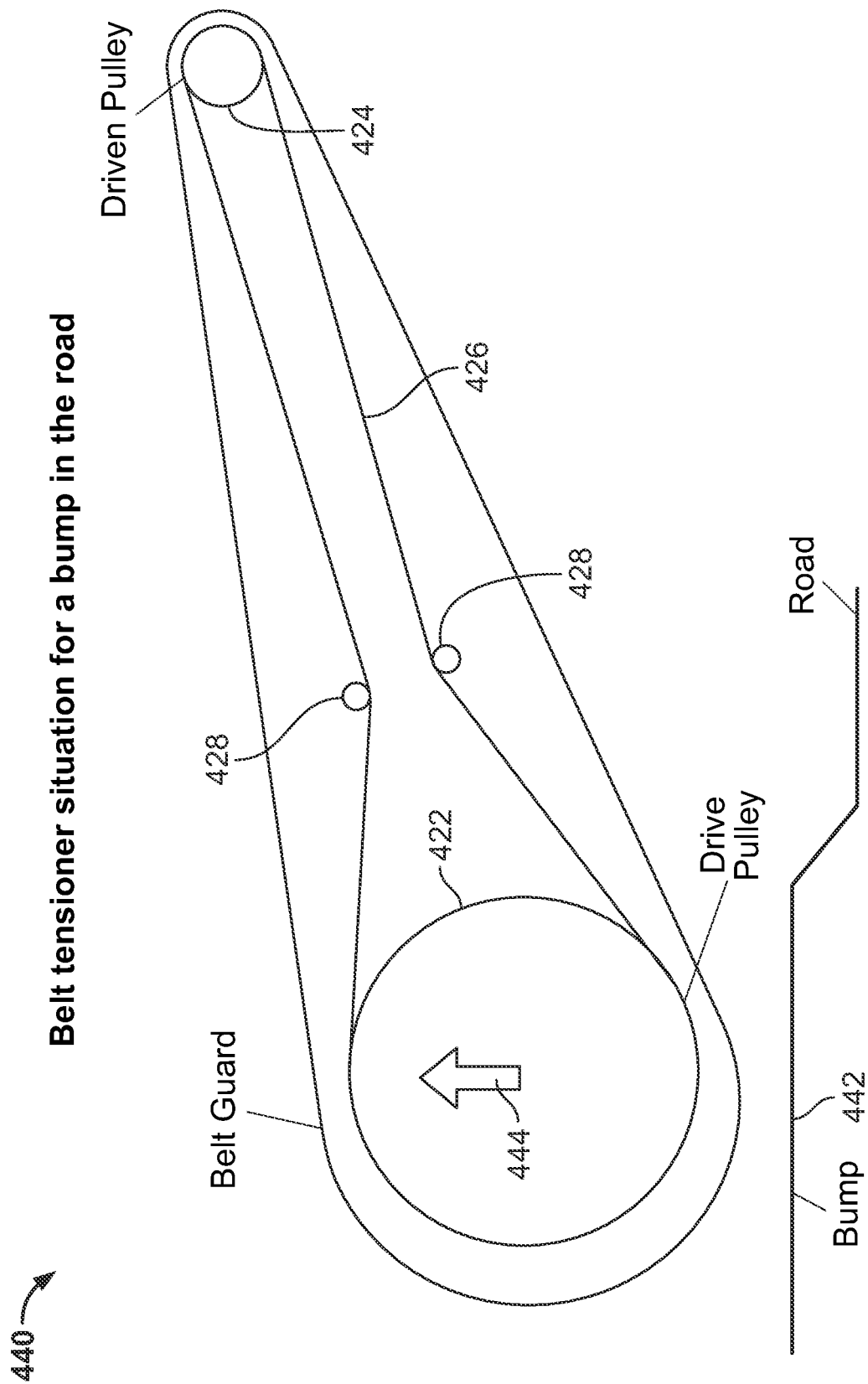
Figure 19:
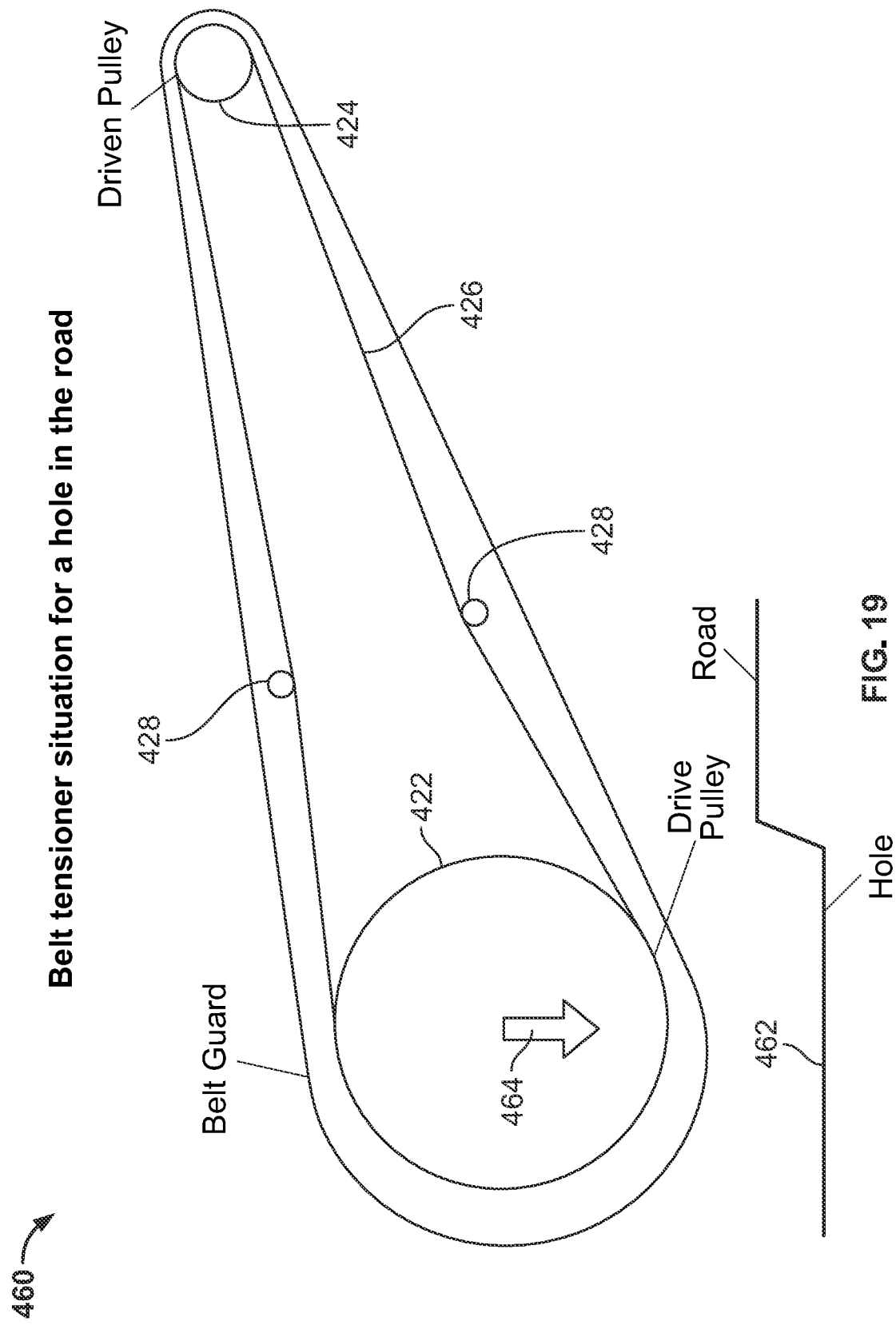

Referring again to FIG. 11, also shown are example tensioners 288, which can be used to maintain an appropriate tension on the one or more belts. FIGS. 17, 18 and 19 are conceptual diagrams 420, 440, 460, respectively, that depict example situations, and show how vertical movement of a wheel of a vehicle to which the drive pulley may be attached may affect system operation. FIG. 17 is a conceptual diagram 420 that shows an example representation of an example drive pulley 422, and example driven pulley 424, and example belt 426 that couples the drive pulley 422 to the driven pulley 424, and example tensioners 428 for a wheel and tire that is rotating on level ground 430.

FIG. 18 is a conceptual diagram 440 that shows an example representation of the drive pulley 422, driven pulley 424, belt 426 and tensioners 428 when the wheel and tire encounter a bump 442 in the road. When the wheel and tire encounter the bump 442, the wheel and tire will move upward, as represented by the arrow 444 in FIG. 18. As can be seen in the diagram 440 of FIG. 18 in comparison to the diagram 420 of FIG. 17, when the wheel and tire encounter the bump 442 and move upward 444, the drive pulley 422 also moves upward 444, which may cause reduced tension (e.g., slack) in the belt 426 between the drive pulley 422 and the driven pulley 424. The tensioners 428 may react to the reduced tension in the belt 426 caused by the upward movement 444 of the drive pulley 422, and may maintain a proper tension on the belt 426 by increasing tension on the belt 426, for example.

FIG. 19 is a conceptual diagram 460 that shows an example representation of the drive pulley 422, driven pulley 424, belt 426 and tensioners 428 when the wheel and tire encounter a hole 462 in the road. When the wheel and tire encounter the hole 462, the wheel and tire will move downward, as represented by the arrow 464 in FIG. 19. As can be seen in the diagram 460 of FIG. 19 in comparison to the diagram 420 of FIG. 17, when the wheel and tire encounter the hole 462 and move downward 464, the drive pulley 422 may also moves downward 464, which may cause increased tension in the belt 426 between the drive pulley 422 and the driven pulley 424. The tensioners 428 may react to the increased tension in the belt 426 caused by the downward movement 464 of the drive pulley 422, and may maintain a proper tension on the belt 426 by reducing tension on the belt 426, for example.

Figure 20:
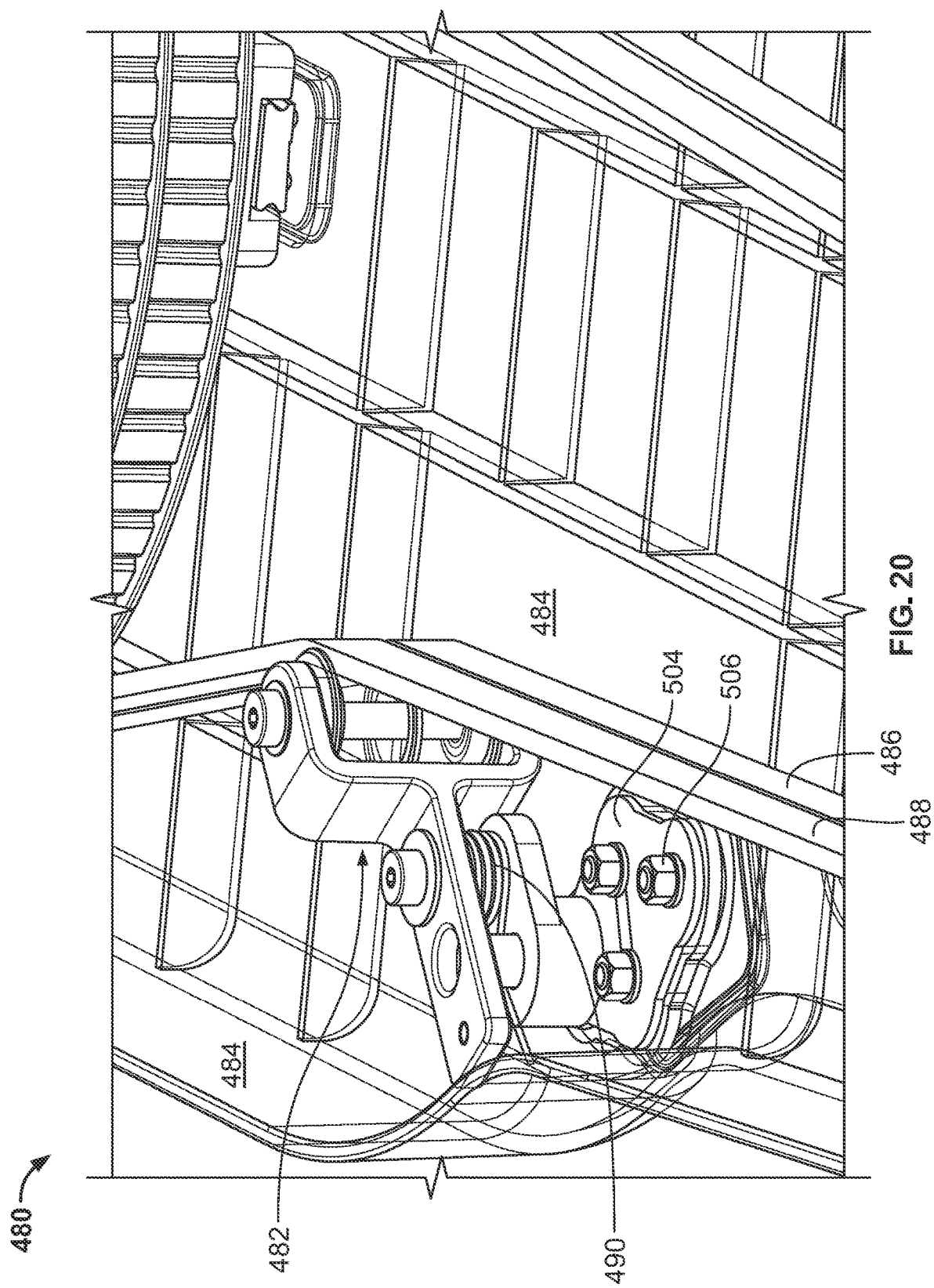
FIG. 20 is a conceptual perspective view of an example tensioner mounted to an example guard or cover.

FIG. 20 is a conceptual perspective view 480 of an example tensioner 482 mounted to an example guard or cover 484. The tensioner 482 may represent the tensioner 428 in FIGS. 17-19, according to some examples. The tensioner 482 may represent the tensioners 288 of FIG. 11, according to some examples. In various implementations, the tensioner 482 may operate to maintain a proper tension on a belt, such as the belt 426 of FIGS. 17-19, for example. In the depicted example of FIG. 20, the tensioner 482 may be configured to maintain an appropriate tension on two belts, such as a first belt 486 and a second belt 488 that may couple a drive pulley to a driven pulley, for example. The tensioner 482 may include a spring 490 that may provide tension for a portion of the tensioner 482 against the one or more belts, according to various implementations. In some examples, the belts 486, 488 may be cogged belts. In some examples, the belts 486, 488 may be non-cogged belts.

Figure 21:
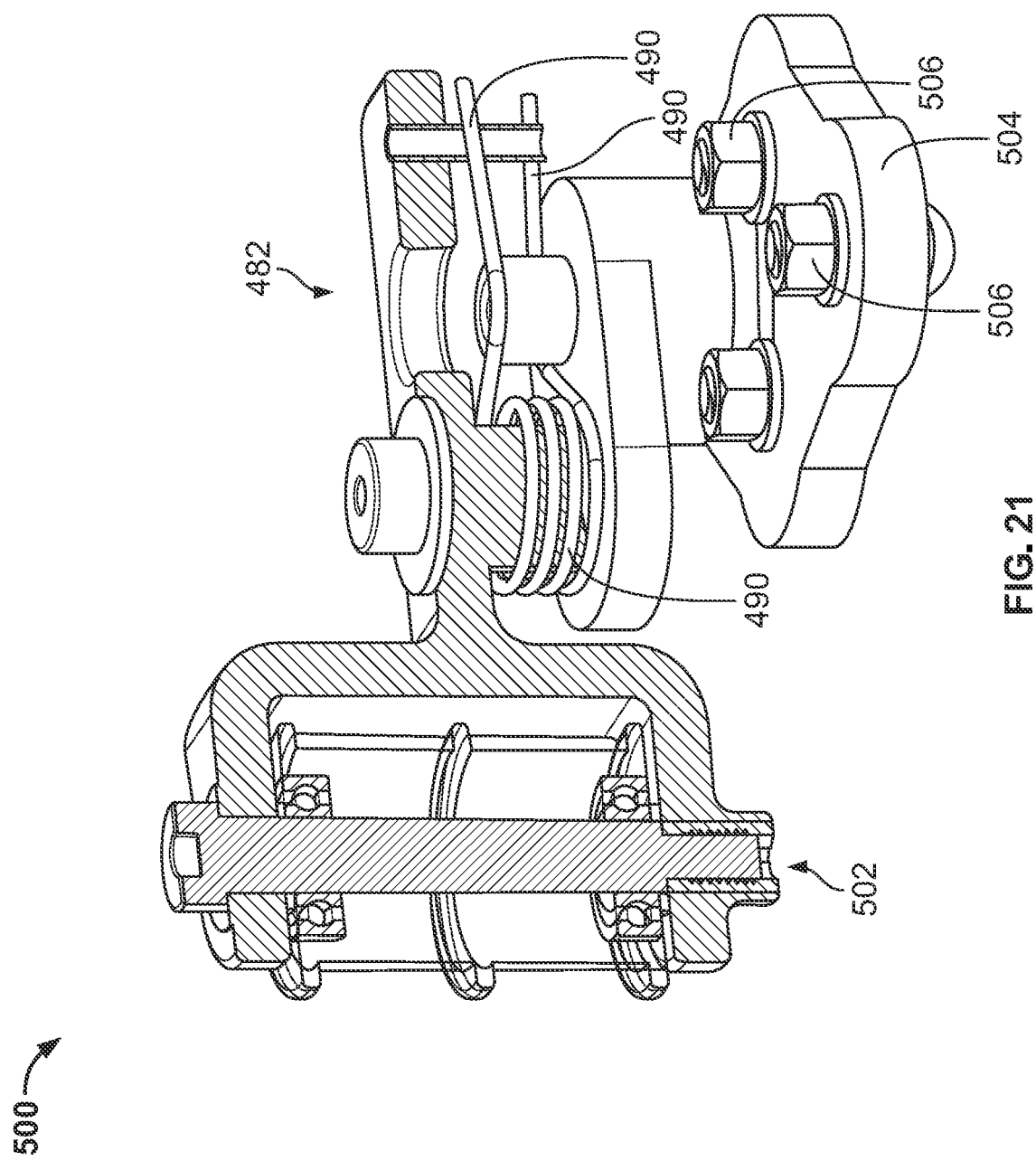
FIG. 21 is a conceptual view of the example tensioner of FIG. 20, and shows a portion of the tensioner as a cutaway view.

FIG. 21 is a conceptual view 500 of the example tensioner 482 of FIG. 20, and shows a portion 502 of the tensioner 482 as a cutaway view. As can be seen in FIG. 20, the tensioner 482 includes a mounting plate 504 and one or more bolts 506 that can be used to mount the tensioner 482 to the guard or cover 484, in various implementations. In some examples (not shown in FIG. 20), the tensioner 482 may be mounted to a side of a vehicle rather than to the guard or cover 484.

Referring again to FIG. 4, an example guard or cover 132 is depicted. The guard or cover 132 may cover a drive pulley, one or more belts, one or more tensioners, and a driven pulley, in some examples, to provide protection to these components of the system, according to various implementations. In some examples, the guard or cover 132 may correspond to the cover 484 of FIG. 20.

Referring again to FIGS. 12, 13, 14 and 15, a portion of an example guard or cover 318 is shown, and is depicted as partially transparent so that the driven pulley 304, belts 322 and 324, and impeller 310 are visible. In some examples, the guard or cover 318 may correspond to the cover 484 of FIG. 20, or to the cover 132 of FIG. 4.

Figure 22:
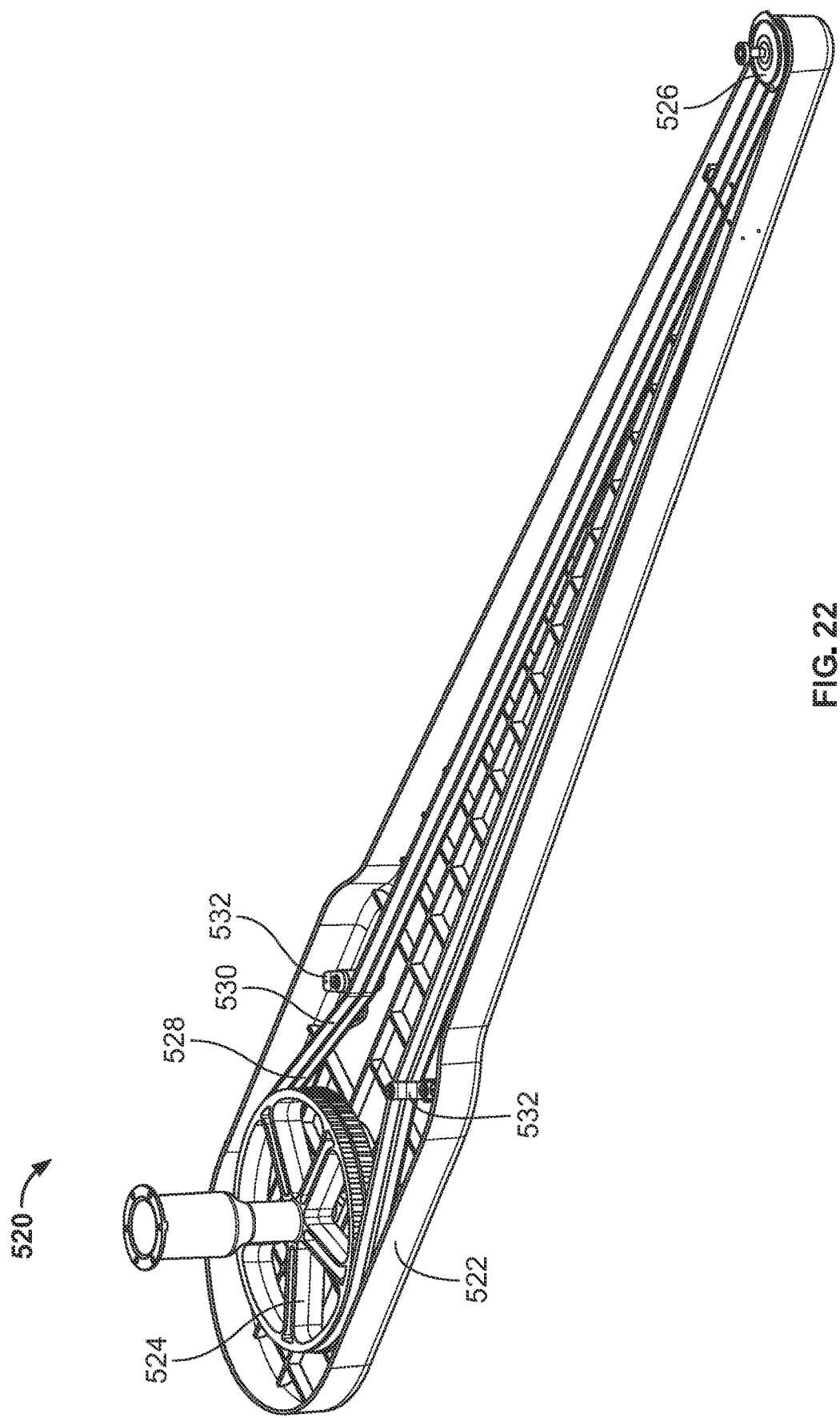
FIG. 22 is a perspective view of an example guard or cover, an example drive pulley, an example driven pulley, an example first belt, an example second belt, and example tensioners.

FIG. 22 is a perspective view 520 of an example guard or cover 522, an example drive pulley 524, an example driven pulley 526, an example first belt 528, an example second belt 530, and example tensioners 532. The first belt 528 and the second belt 530 may couple the drive pulley 524 to the driven pulley 526, according to various implementations. In some examples, the belts 528, 530 may be cogged belts. In some examples, the belts 528, 530 may be non-cogged belts. In some examples a single belt (e.g., belt 528 or belt 530) may be used.

The cover 522 may prevent stones, rocks, leaves, litter, debris, or other objects from interfering with any of the aforementioned components shown in FIG. 22, according to various implementations. In some examples, by generally covering or providing protection to the aforementioned components, the cover 522 may increase safety, and may prevent injury or damage to persons or property that might be caused by rotating pulleys or belts were such components to be exposed, for example. In some examples, the cover 522 may correspond to the cover 132 of FIG. 4, to the cover 318 of FIGS. 12-15, or to the cover 484 of FIG. 20.

Figure 23:
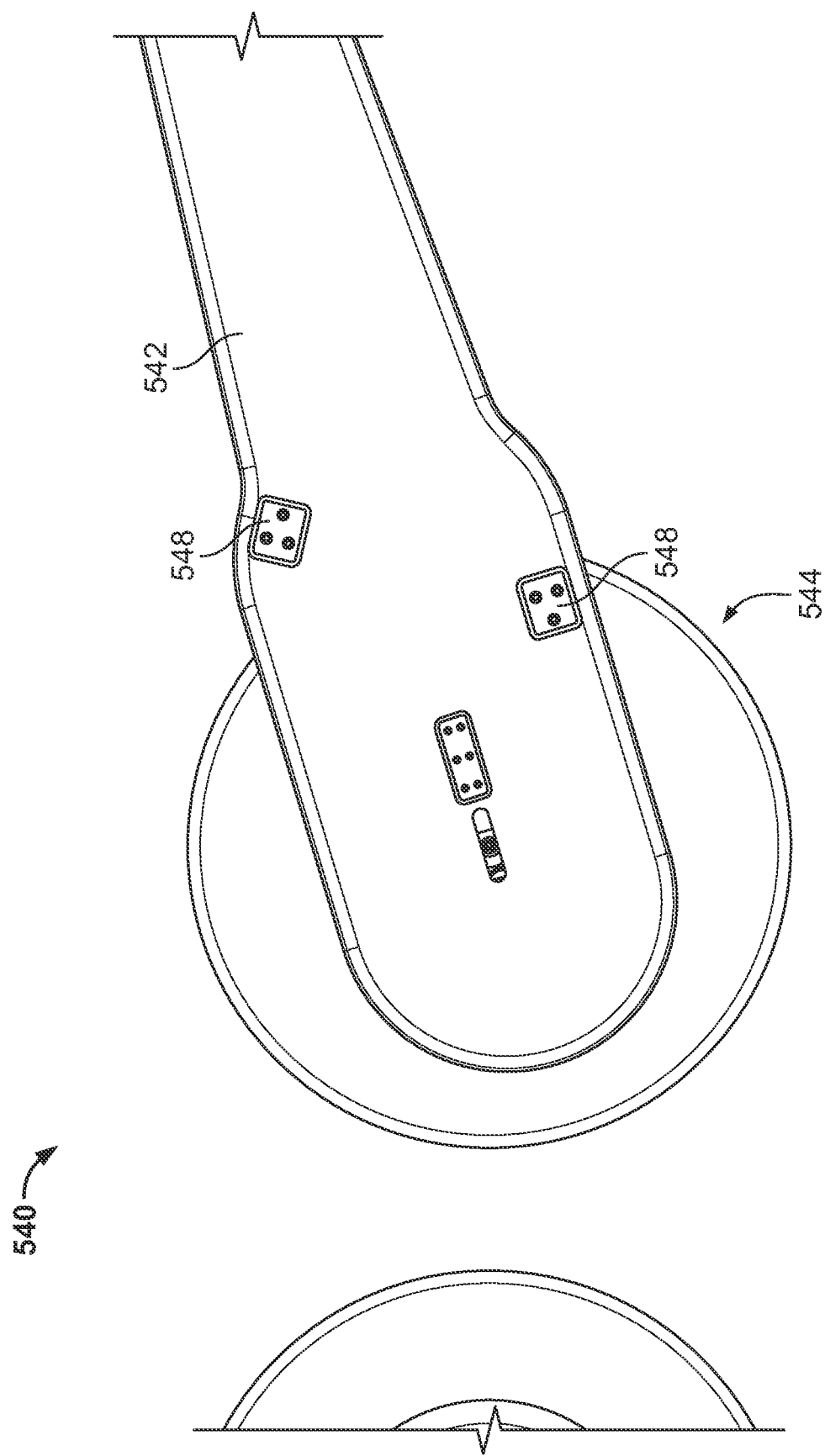
FIGS. 23 and 24 are side views of an example guard or cover and an example wheel and tire of a vehicle.
Figure 24:
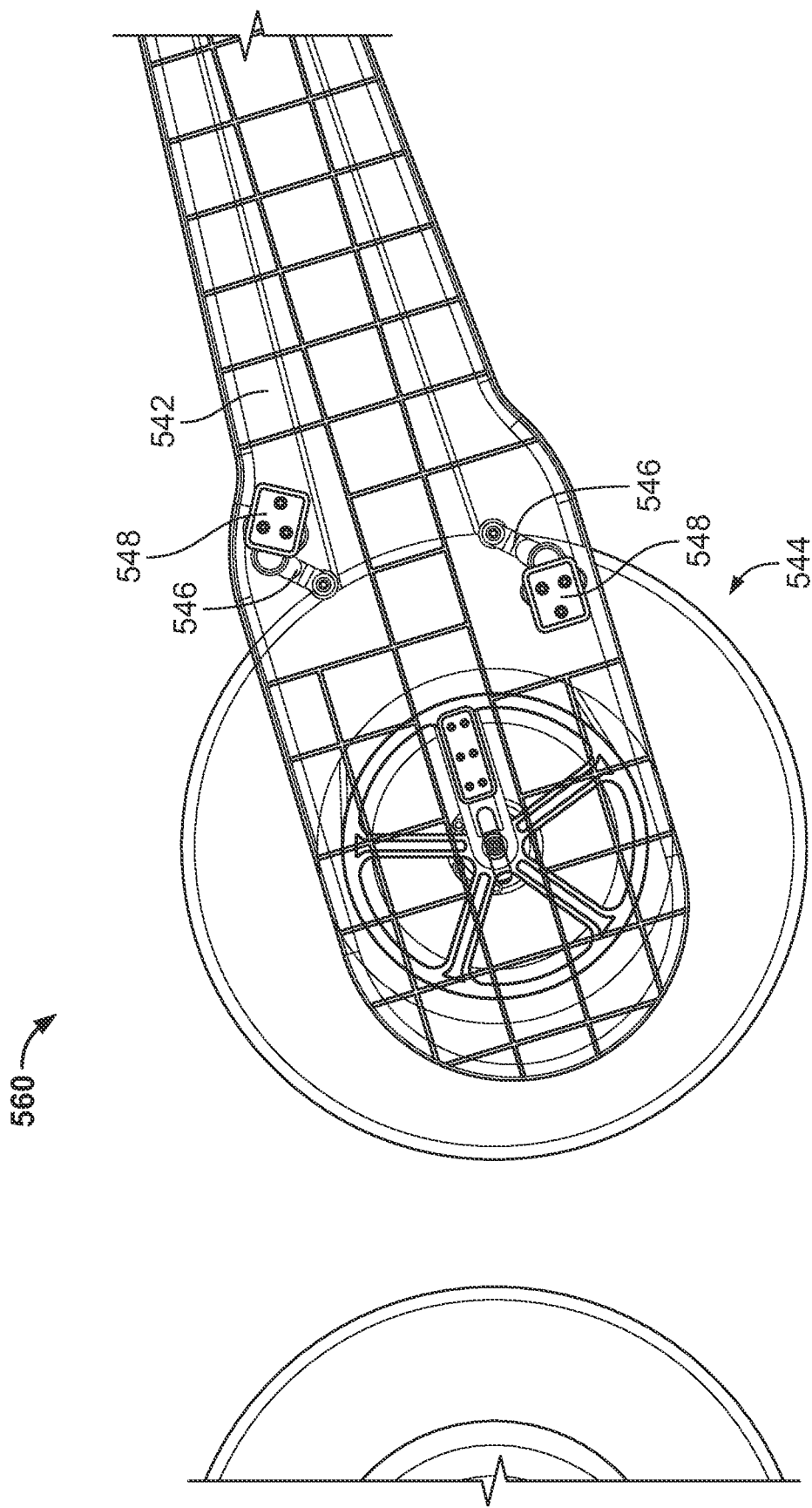

FIGS. 23 and 24 are side views 540 and 560, respectively, of an example guard or cover 542 and an example wheel and tire 544 of a vehicle. In the view 560 of FIG. 24, the cover 542 is depicted as being partially transparent. Example tensioners 546, which may be used to maintain an appropriate tension on one or more belts of a system for improving vehicle efficiency as previously described, are shown attached to the cover 542 using example attachment plates 548.

Figure 25:
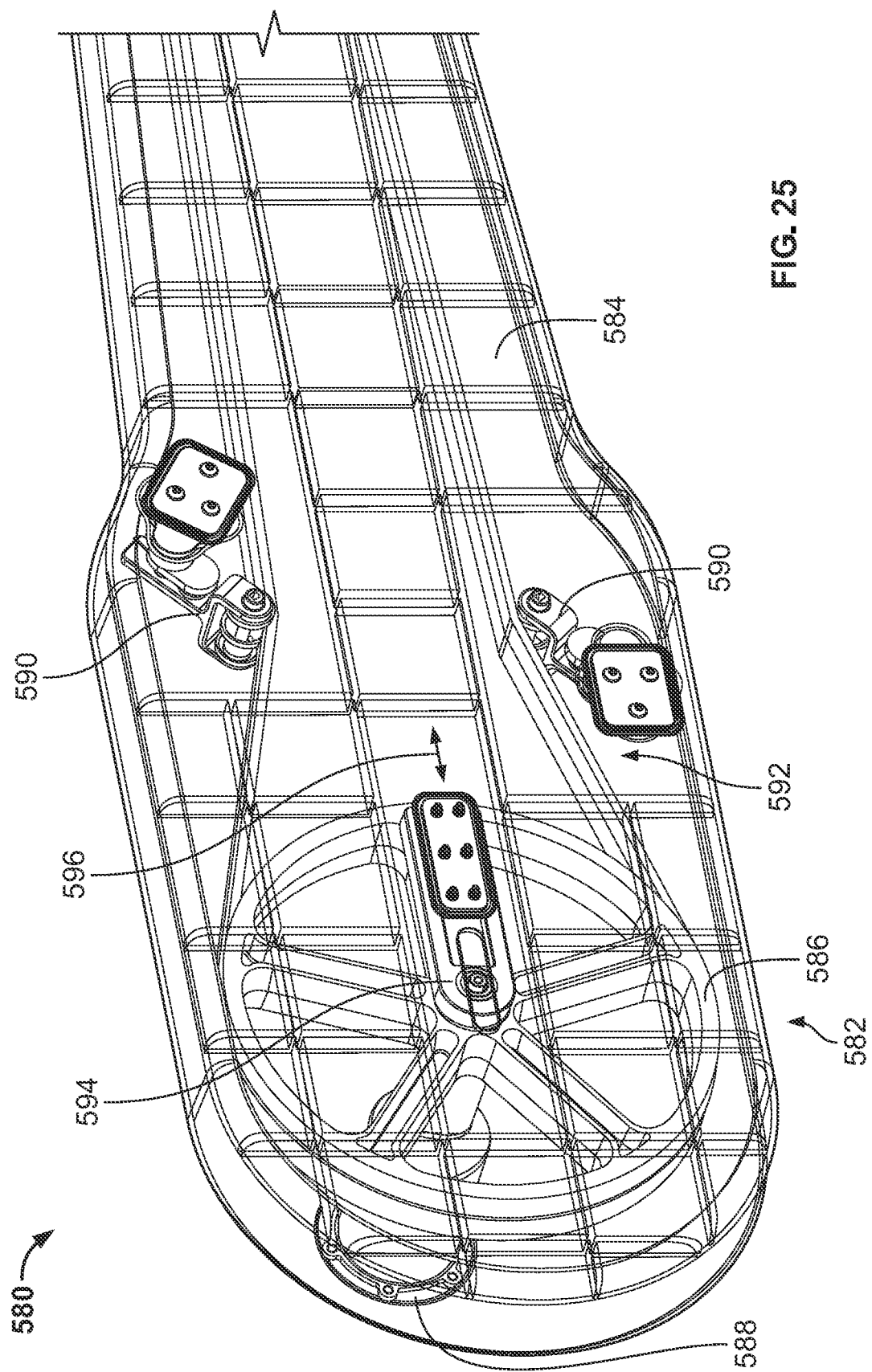
FIG. 25 is a conceptual view of a portion of an example system for improving vehicle efficiency.

FIG. 25 is a conceptual view 580 of a portion 582 of an example system for improving vehicle efficiency. The system includes an example guard or cover 584, depicted as partially transparent in FIG. 25, an example drive pulley 586 that may be attached to an example wheel of a vehicle via an example mounting element 588, example belt tensioners 590 that may maintain an appropriate tension on one or more belts 592, which may couple the drive pulley 586 to a driven pulley (not shown in FIG. 25). For example, the belt tensioners 590 may increase a tension on the one or more belts 592 in situations where there is decreased tension (e.g., slack) in the one or more belts 592, and may decrease a tension on the one or more belts 592 in situations where there is increased tension on the one or more belts 592. In the depicted example, the one or more belts 592 may be cogged belts. In some examples, the one or more belts 592 may belts may be non-cogged belts.

Also depicted in FIG. 25 is an example slide adjuster 594. In some examples, the slide adjuster 594 may permit adjustment of a distance from a centerline of the drive pulley 586 to a centerline of a driven pulley (not shown in FIG. 25) to maintain a preferred distance between centerlines of the pulleys when movement that may alter the preferred distance is experienced either at the drive pulley or at the driven pulley, for example. The slide adjuster 594 may adjust a centerline distance between the pulleys by adjusting a position at the drive pulley 586, for example by sliding left or right along a dimension 596. In some examples, the slide adjuster 594 may be a linear slide adjuster. In some examples, the slide adjuster 594 may be a ball slide adjuster.

Figure 26:
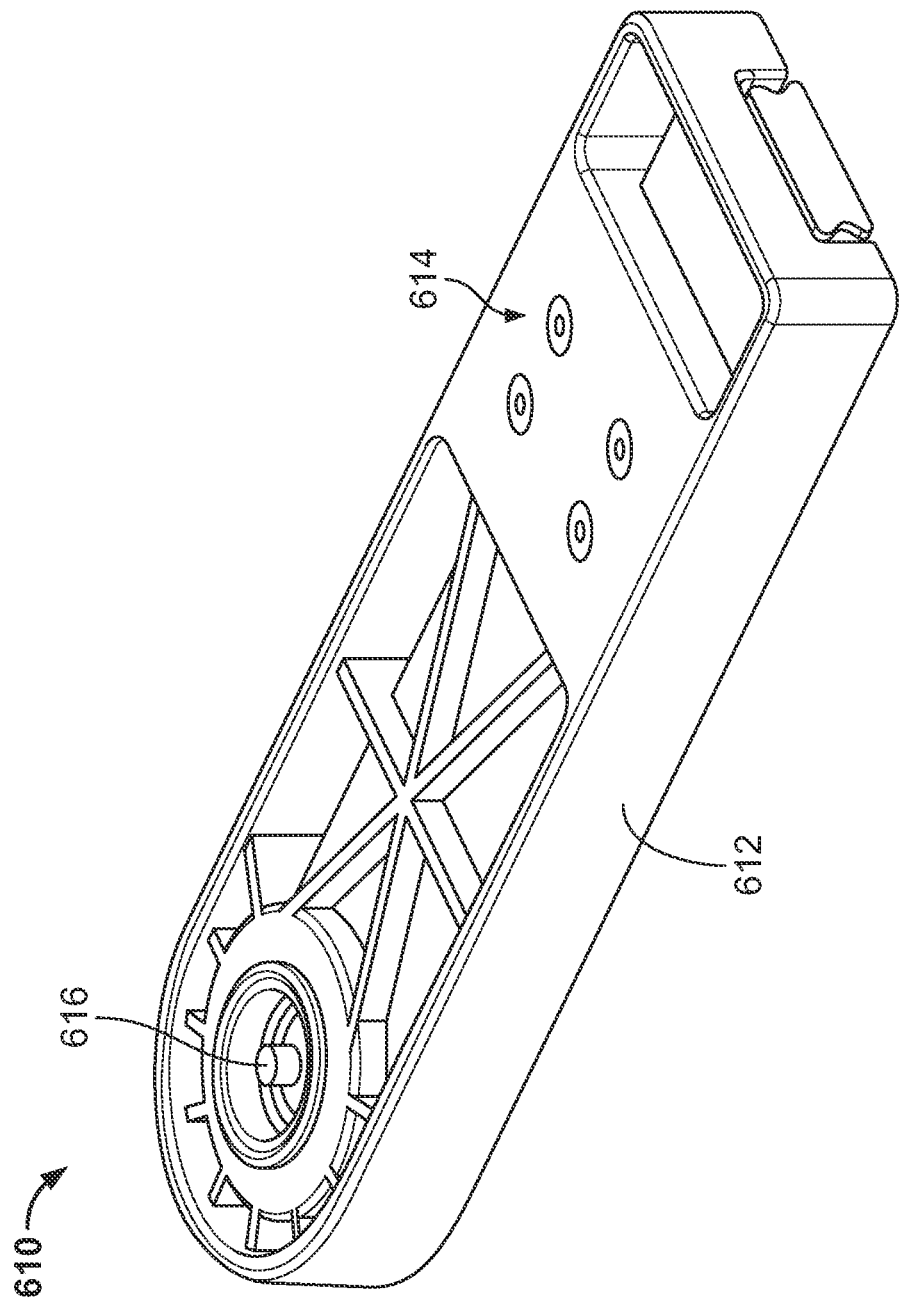
FIG. 26 is a perspective view of an example slide adjuster.

FIG. 26 is a perspective view 610 of an example slide adjuster 612. In some examples, the slide adjuster 612 may correspond to the slide adjuster 594 of FIG. 25. In some examples, the slide adjuster 612 may be mounted to a cover, such as cover 584 of FIG. 25 for example, via one or more mounting holes 614 and one or more attachment components (e.g., one or more bolts and nuts, or the like). FIG. 25 shows that the slide adjuster 594 is mounted to the cover 584 in this manner, for example. In some examples, the slide adjuster 612 may also be attached to a drive pulley, such as drive pulley 586 of FIG. 25 for example, via an attachment bolt 616. FIG. 25 shows that the slide adjuster 594 is mounted to the drive pulley 586 in this manner, for example. In some examples, a portion of the slide adjuster 612 that may be associated with the one or more mounting holes 614 may remain fixed to the cover to which it is attached, and a portion of the slide adjuster 612 that may be associated with the attachment bolt 616 may slide left or right in response to one or more movements associated with the vehicle, for example.

In some examples, the systems for improving vehicle efficiency, or sub-systems thereof, or portions thereof, described herein may include a belt detection system that may include one or more sensors and associated electronics that may provide an indication of whether the system is operational. For example, such sensors may sense for a broken belt, or for a belt that has become non-operational, and if the belt detection system determines that a belt is broken or has become non-operational, the belt detection system may provide a warning indicator or message to an operator so that corrective action may be taken. As has been previously described herein with respect to various examples, such belts may couple a drive pulley to a driven pulley of a system for improving vehicle efficiency.

Figure 27:
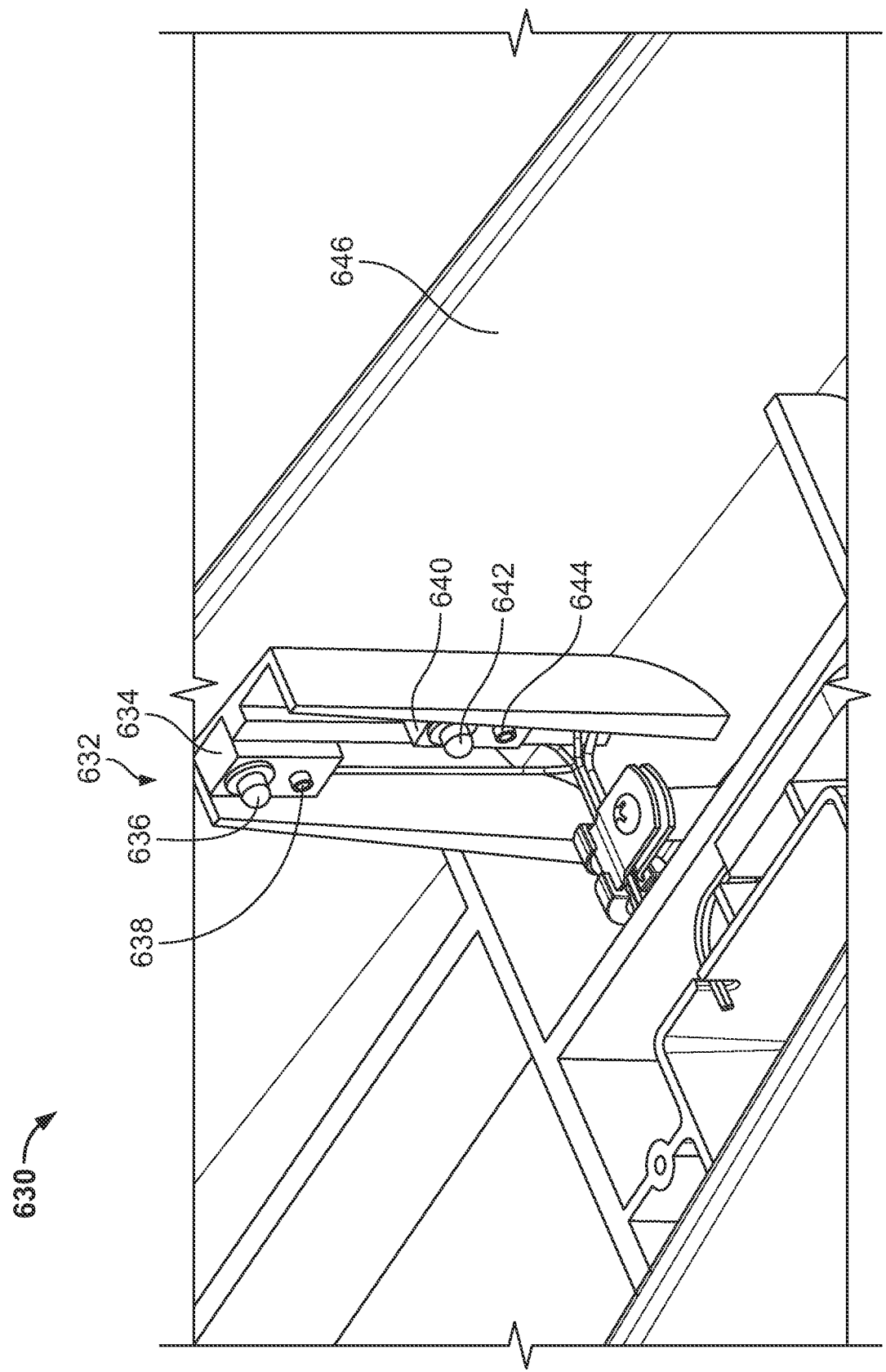
FIG. 27 is a perspective view of a portion of an example belt detection system that may be used with a system for improving vehicle efficiency.

FIG. 27 is a perspective view 630 of a portion 632 of an example belt detection system that may be used with a system for improving vehicle efficiency, according to various implementations. An example first sensor 634 includes an example first light emitter 636, which may emit a light beam. In some examples, the emitter 636 may emit a laser beam. The sensor 634 also includes an example first light receiver 638 that may be configured to receive an emitted light beam. In some examples, the receiver 638 may be configured to receive a laser beam. An example second sensor 640 includes an example second light emitter 642, which may emit a light beam. In some examples, the emitter 642 may emit a laser beam. The sensor 640 also includes an example second light receiver 644 that may be configured to receive an emitted light beam. In some examples, the receiver 644 may be configured to receive a laser beam. The sensors 634 and 640 of FIG. 27 include both a light emitter and a light receiver. In some examples, one or both of the sensors 634, 640 may not include a light emitter, or may not include a light receiver, for example. The portion 632 of the system is shown mounted to an example guard or cover 646.

Figure 28:
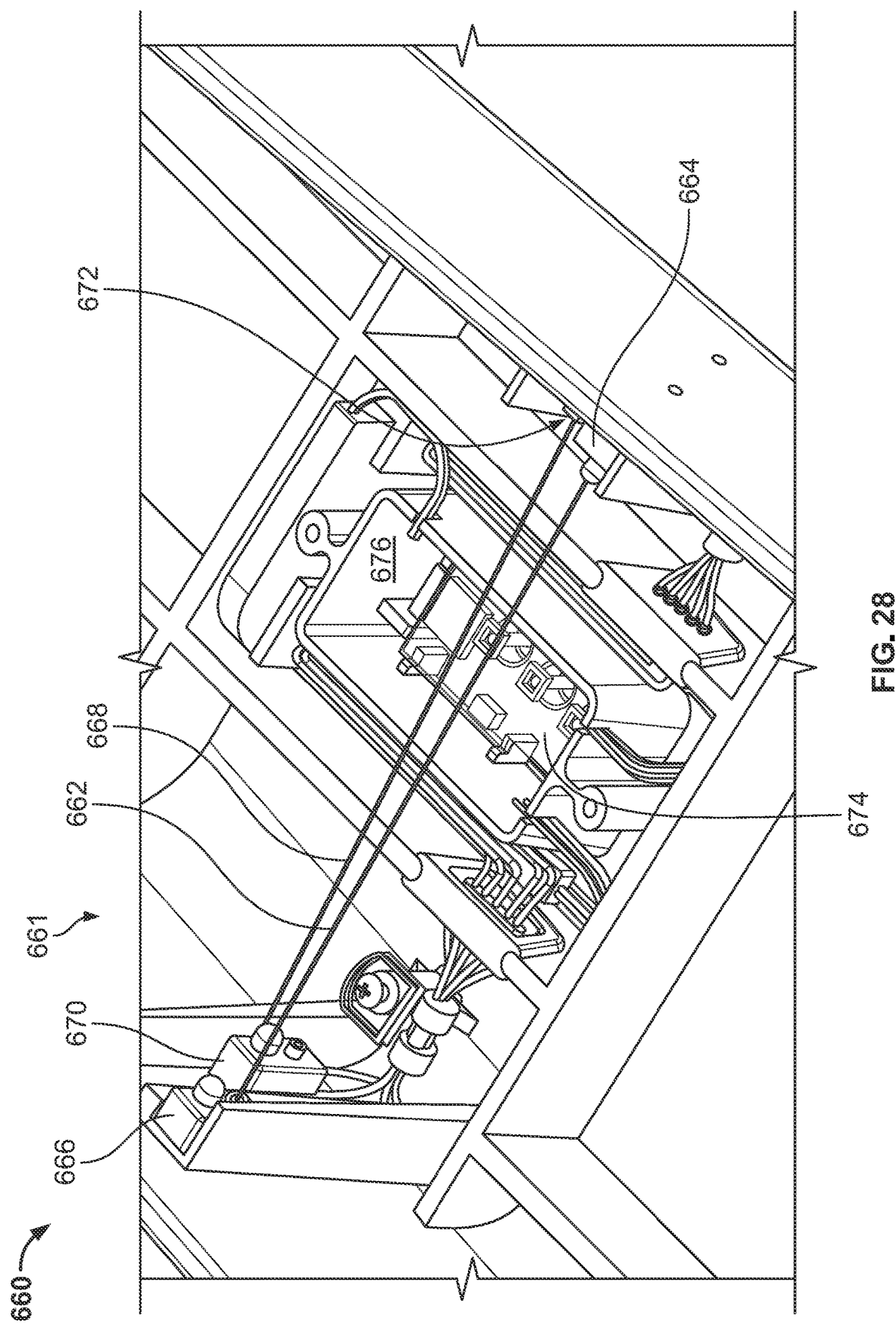
FIG. 28 is a perspective view of a portion of an example belt detection system in an example system for improving vehicle efficiency.

FIG. 28 is a perspective view 660 of a portion 661 of an example belt detection system in an example system for improving vehicle efficiency. FIG. 28 shows an example first light beam 662, which may be emitted by a light emitter of an example first sensor 664 and may be received by a light receiver of an example second sensor 666, according to various implementations. FIG. 28 also shows an example second light beam 668, which may be emitted by a light emitter of an example third sensor 670 and may be received by a light receiver of an example fourth sensor 672, according to various implementations. The system may include an example printed circuit board 674 that may include components that may perform operations, tasks or functions for the belt detection system. For example, the printed circuit board 674 may include example components for generating one or more light beams, example components for determining whether a fault condition exists based on receipt or non-receipt of a light beam at a light receiver sensor, example components for providing a warning indicator, example components for transmitting a warning message (e.g., by wireless transmission), or other operations, tasks, or functions according to some examples. In some examples, the belt detection system may include one or more batteries that may be used to power components of the printed circuit board 674 and various sensors associated with the belt detection system, such as the sensors 664, 666, 670 and 672, for example. In some examples, the system may include an example dust cover 676 that may protect the printed circuit board 674 and associated components, according to various implementations.

As can be seen with reference to FIG. 28, the light receiver of the second sensor 666 may be positioned or aligned to receive the light beam 662 produced by the light emitter of the first sensor 664. Similarly, the light receiver of the fourth sensor 672 may be positioned or aligned to receive the light beam 668 produced by the light emitter of the third sensor 670. In this manner, the light receivers may be expected to receive the light beam emitted by a light emitter absent anything in the path between the corresponding light emitter and light receiver that might interrupt the light beam or block the light beam from reaching the light receiver, for example.

Figure 29:
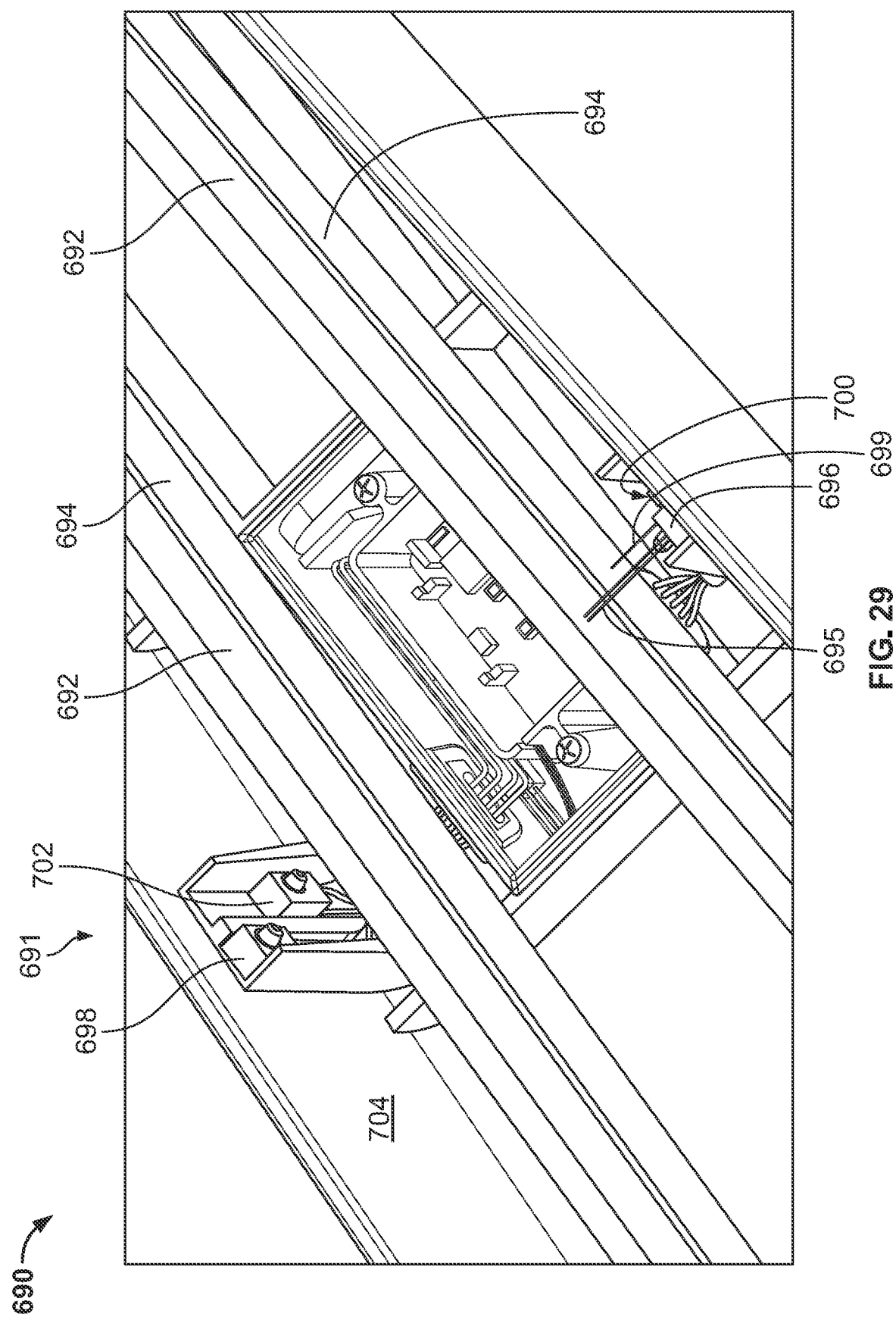
FIG. 29 is a perspective view of a portion of an example belt detection system in an example system for improving vehicle efficiency.

FIG. 29 is a perspective view 690 of a portion 691 of an example belt detection system in an example system for improving vehicle efficiency. As can be seen in FIG. 29, an example first belt 692 and an example second belt 694 are shown, and in some examples the first belt 692 and the second belt 694 may couple a drive pulley to a driven pulley, as has been described herein above with reference to various examples. In some examples, the belts 692 and 694 may be cogged belts. In some examples, the belts 692 and 694 may be non-cogged belts.

With the belts 692 and 694 present and in operational position within the system, light beams generated by light emitters of the belt detection system may be intercepted or blocked by the belts 692 or 694, for example, such that light receivers of the belt detection system may not receive the light beam emitted by the light emitters due to blockage of the beam by a belt. For example, an example first light beam 695 that may be generated by an example light emitter of an example first sensor 696 may not be detected by an example light receiver of an example second sensor 698 because the first belt 692 may block transmission of the first light beam 695 and may thus prevent the first light beam 695 from reaching the light receiver, which may be positioned or aligned to receive the light beam 695 absent the belt 692 being in operational position. Similarly, for example, an example second light beam 699 that may be generated by an example light emitter of an example third sensor 700 may not be detected by an example light receiver of an example fourth sensor 702 because the second belt 694 may block transmission of the second light beam 699 and may thus prevent the second light beam 699 from reaching the light receiver, which may be positioned or aligned to receive the second light beam 699 absent the belt 694 being in operational position.

For example, if a belt is properly positioned and working in the system, such as belts 692 and 694 in FIG. 29, the belt may obstruct the light from the light emitter from reaching the light receiver, and the belt detection system may indicate that the system for improving vehicle efficiency is operating properly. Alternatively, a belt that has broken may no longer be in operational position and may no longer be positioned between the light emitter and receiver and may not intercept the light beam of the emitter, so that the light receiver may receive the emitted light beam, such as shown in FIG. 28, and the belt detection system may indicate that the belt is broken and the system for improving vehicle efficiency is not operating properly.

Figure 30:
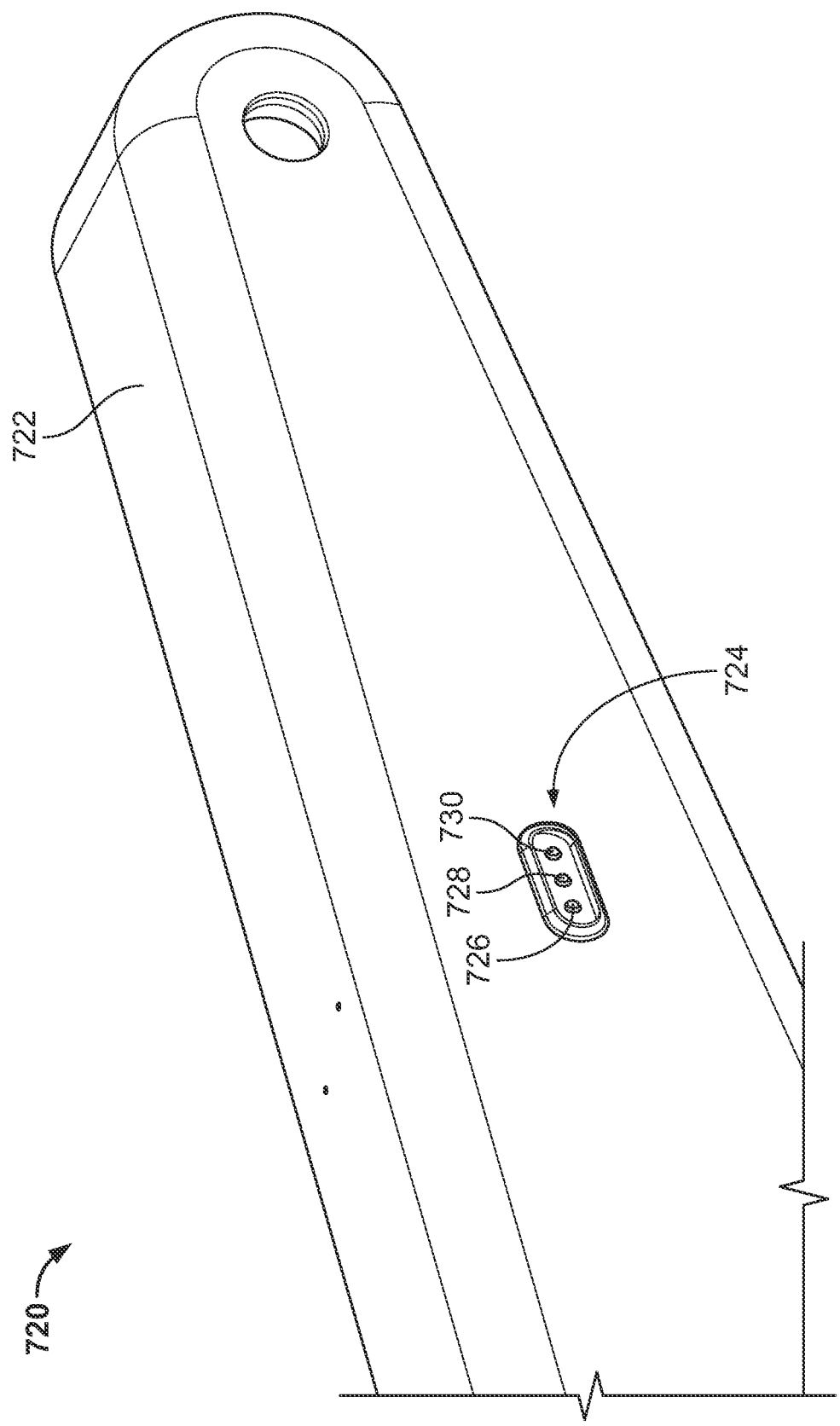
FIG. 30 is a perspective view of an example guard or cover, and an example status indicator of an example belt detection system.

FIG. 30 is a perspective view 720 of an example guard or cover 722, and an example status indicator 724 of an example belt detection system. The status indicator may include an example first indicator 726, an example second indicator 728, and an example third indicator 730 in the depicted example. In some examples, the indicators 726, 728, 730 may be light emitting diodes (LED's). In some examples, the indicators 726, 728, 730 may have different colors, and each may indicate a particular status of a system for improving vehicle efficiency.

For example, the first indicator 726 may have a white color, or a clear color, and when illuminated may indicate that the one or more belts are properly positioned or operationally positioned, and that the system for improving vehicle efficiency is operating properly, according to some implementations. Such a first indicator 726 may be illuminated, for example, when the system detects that the first and second belts are in operational position, as shown in FIG. 29, as may be determined when light receiver sensors do not receive light beams emitted by light emitters of the belt detection system, for example.

As another example, the third indicator 730 may have a red color, and when illuminated may indicate that one or more belts are not properly positioned or operationally positioned, and that the system for improving vehicle efficiency is not operating properly, according to some implementations. Such a third indicator 730 may be illuminated, for example, when the system detects that one or more of the first belt or the second belt is not in operational position, as may be determined when a light receiver sensor receives a light beam emitted by a light emitter of the system, for example (see e.g., FIG. 28).

In some examples, the second indicator 728 may have a yellow color, and when illuminated may indicate that a battery of the belt detection system may be low on charge, and may need to be replaced or recharged, for example. For example, the belt detection system may include a battery monitor, and may illuminate the second indicator 728 when the battery monitor indicates that the one or more batteries should be recharged or replaced.

Figure 31:
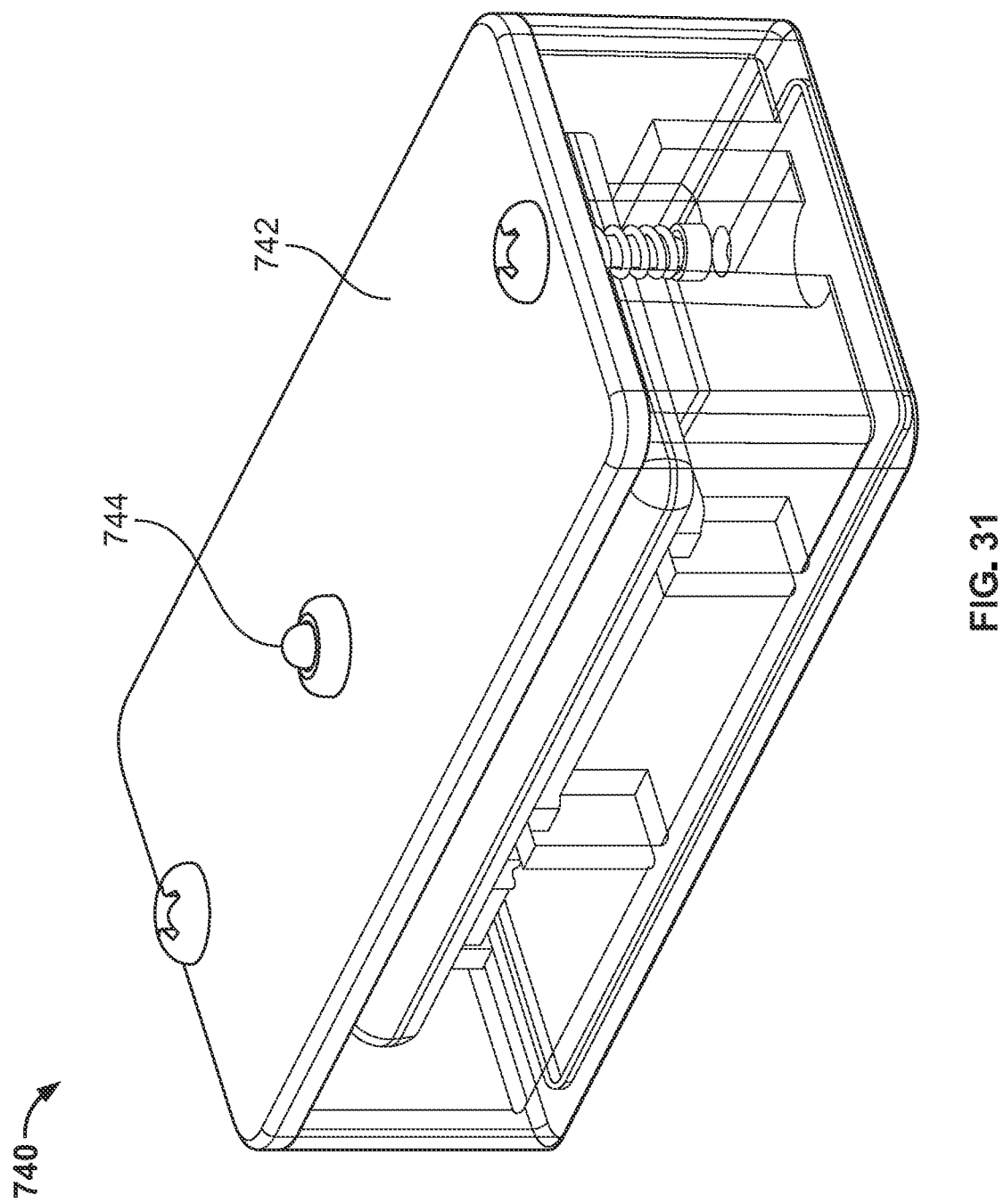
FIG. 31 is a perspective view of an example warning indicator unit, which may be located within a vehicle and may be observable by a driver of the vehicle.

In some examples, in addition to the status LEDs, the sensors or an associated circuit may transmit a wireless message (e.g., a Bluetooth message) for receipt by a receiver within the cab of the tractor or vehicle, to alert a driver of a status, such as a broken or improperly positioned belt, according to various implementations. FIG. 31 is a perspective view 740 of an example warning indicator unit 742, which may be located within a vehicle and may be observable by a driver of the vehicle, according to various implementations. For example, the warning indicator unit 742 may be located within a cab of a tractor of a tractor-trailer. The warning indicator unit 742 includes an example indicator 744 that may illuminate to indicate a status. For example, if the belt detection system determines that a belt is broken or non-operational, the belt detection system may use a transmitter associated with the belt detection system to send a wireless message (e.g., a Bluetooth message) for receipt by a receiver that may be within the warning indicator unit 742, and upon receipt of such a message, the warning indicator unit 742 may illuminate the indicator 744, according to some implementations.

The above description provides examples of some implementations. Other implementations that are not explicitly described above are also possible, such as implementations based on modifications and/or variations of the features described above. For example, the techniques described above may be implemented in different orders, with the inclusion of one or more additional steps, and/or with the exclusion of one or more of the identified steps. Similarly, the systems, devices, and methods described herein may include one or more additional features, may exclude one or more of the identified features, and/or include the identified features combined in a different way than presented above. Features that are described as singular may be implemented as a plurality of such features. Likewise, features that are described as a plurality may be implemented as singular instances of such features. The drawings are intended to be illustrative and may not precisely depict some implementations. Variations in sizing, placement, shapes, angles, curvatures, and/or the positioning of features relative to each other are possible.

What is claimed is:

1. A system for improving efficiency of a vehicle, comprising:
    a first drive pulley, configured to be attached to a left-side wheel of the vehicle, and a second drive pulley, configured to be attached to a right-side wheel of the vehicle;
    a first chamber, configured to be attached to a left side of the vehicle substantially near a rear of the vehicle, the first chamber comprising a first air intake opening at a lower portion of the first chamber, a first air discharge orifice, and a first curved exterior surface;
    a second chamber, configured to be attached to a right side of the vehicle substantially near the rear of the vehicle, the second chamber comprising a second air intake opening at a lower portion of the second chamber, a second air discharge orifice, and a second curved exterior surface;
    a first impeller, attached to the first chamber and comprising a first shaft and a first plurality of blades, the first plurality of blades located interior of the first chamber;
    a second impeller, attached to the second chamber and comprising a second shaft and a second plurality of blades, the second plurality of blades located interior of the second chamber;
    a first driven pulley coupled to the first shaft of the first impeller, and a second driven pulley coupled to second shaft of the second impeller;
    a first belt that couples the first drive pulley to the first driven pulley, and a second belt that couples the second drive pulley to the second driven pulley;
    wherein rotation of the left-side wheel causes rotation of the first drive pulley, which causes rotation of the first driven pulley via the first belt, and wherein the rotation of the first driven pulley causes rotation of the first shaft, which causes rotation of the first plurality of blades; and wherein rotation of the right-side wheel causes rotation of the second drive pulley, which causes rotation of the second driven pulley via the second belt, and wherein the rotation of the second driven pulley causes rotation of the second shaft, which causes rotation of the second plurality of blades.

2. The system of claim 1, wherein:

the rotation of the first plurality of blades draws air from outside the first chamber into the first chamber via the first air intake opening and pressurizes the air within the first chamber; and the rotation of the second plurality of blades draws air from outside the second chamber into the second chamber via the second air intake opening and pressurizes the air within the second chamber.

3. The system of claim 2, wherein:

the pressurized air within the first chamber discharges from the first chamber via the first air discharge orifice and follows the first curved exterior surface of the first chamber; and the pressurized air within the second chamber discharges from the second chamber via the second air discharge orifice and follows the second curved exterior surface of the second chamber.

4. The system of claim 3, wherein the pressurized air that follows the first curved exterior surface of the first chamber opposes the pressurized air that follows the second curved exterior surface of the second chamber, to create an area of higher pressure behind the vehicle as compared to ambient pressure.

5. The system of claim 1, wherein the vehicle comprises a tractor-trailer that includes a tractor and a trailer, wherein the first drive pulley is configured to be attached to a left rear wheel of the trailer and the second drive pulley is configured to be attached to a right rear wheel of the trailer.

6. The system of claim 5, wherein:

the first chamber is attached to a left side of the trailer, and the first curved exterior surface extends to a back edge of the left side of the trailer; and the second chamber is attached to a right side of the trailer, and the second curved exterior surface extends to a back edge of the right side of the trailer.

7. The system of claim 1, wherein the first air discharge orifice comprises a first slot that extends substantially a greatest length of the first chamber, and wherein the second air discharge orifice comprises a second slot that extends substantially an entire greatest length of the second chamber.

8. The system of claim 7, wherein the first slot includes a first reinforcement member, and wherein the second slot includes a second reinforcement member.

9. The system of claim 1, further comprising a first redundant belt that couples the first drive pulley to the first driven pulley, and a second redundant belt that couples the second drive pulley to the second driven pulley.

10. The system of claim 1, wherein the first curved exterior surface of the first chamber is a convex surface, and wherein the second curved exterior surface of the second chamber is a convex surface.

11. The system of claim 1, wherein the first curved exterior surface of the first chamber has a quarter-circle shape, and wherein the second curved exterior surface of the second chamber has a quarter-circle shape.

12. The system of claim 1, wherein the vehicle is diesel-powered, and wherein the system improves fuel efficiency of the vehicle.

13. The system of claim 1, wherein the vehicle is gasoline-powered, and wherein the system improves fuel efficiency of the vehicle.

14. The system of claim 1, wherein the vehicle is battery-powered, and wherein the system improves battery efficiency of the vehicle.

15. The system of claim 1, further comprising a first tensioning pulley configured to maintain a first tension on the first belt, and further comprising a second tensioning pulley configured to maintain a second tension on the second belt.

16. The system of claim 1, further comprising a first sensor configured to detect a failure of the first belt, and further comprising a second sensor configured to detect a failure of the second belt.

17. The system of claim 1, wherein the first sensor includes an indicator of the failure of the first belt, and wherein the second sensor includes an indicator of the failure of the second belt.

18. The system of claim 1, further comprising:

a first guard element that covers the first drive pulley, the first belt, the first driven pulley and the first impeller; and a second guard element that covers the second drive pulley, the second belt, the second driven pulley and the second impeller.

19. The system of claim 1, further comprising:

a first slide adjuster configured to adjust a centerline distance from a shaft of the first drive pulley to a shaft of the first driven pulley; and a second slide adjuster configured to adjust a centerline distance from a shaft of the second drive pulley to a shaft of the second driven pulley.

* * * * *